United States Patent [19]
Allan et al.

[11] Patent Number: 5,931,277
[45] Date of Patent: Aug. 3, 1999

[54] MONEY VALIDATION SYSTEM USING ACCEPTANCE CRITERIA

[75] Inventors: Richard Douglas Allan, Reading; Derek Hutchinson, Wokingham; Bernard Joseph Campbell, Sherfield-on-Loddon, all of United Kingdom; Frank Mars, McLean, Va.

[73] Assignee: Mars, Incorporated, McLean, Va.

[21] Appl. No.: 08/952,240

[22] PCT Filed: May 9, 1995

[86] PCT No.: PCT/GB96/01109

§ 371 Date: Feb. 2, 1998

§ 102(e) Date: Feb. 2, 1998

[87] PCT Pub. No.: WO96/36022

PCT Pub. Date: Nov. 14, 1996

[30] Foreign Application Priority Data

May 9, 1995 [GB] United Kingdom .................. 9509387

[51] Int. Cl.⁶ ..................................................... G07D 5/08
[52] U.S. Cl. ............................................................ 194/317
[58] Field of Search ................................. 194/206, 317, 194/318, 319

[56] References Cited

U.S. PATENT DOCUMENTS

| | | | |
|---|---|---|---|
| 4,417,450 | 11/1983 | Morgan, Jr. et al. | 62/126 |
| 4,463,607 | 8/1984 | Hilton . | |
| 4,864,238 | 9/1989 | Seitz . | |
| 4,967,156 | 10/1990 | Seitz . | |
| 5,104,006 | 4/1991 | Seitz . | |
| 5,167,313 | 12/1992 | Dobbins et al. | 194/317 |
| 5,217,224 | 6/1993 | Sincock | 273/138 |
| 5,351,798 | 10/1994 | Hayes . | |
| 5,355,989 | 10/1994 | Best | 194/317 |
| 5,371,681 | 12/1994 | Juds et al. | 364/479 |
| 5,392,364 | 2/1995 | Yokoyama et al. . | |
| 5,404,987 | 4/1995 | Allan et al. | 194/317 |

FOREIGN PATENT DOCUMENTS

| | | |
|---|---|---|
| 0 155 126 A2 | 9/1985 | European Pat. Off. . |
| 0 367 921 A2 | 5/1990 | European Pat. Off. . |
| 0 480 736 A2 | 4/1992 | European Pat. Off. . |
| 0 505 609 A2 | 9/1992 | European Pat. Off. . |
| 0 520 230 A1 | 12/1992 | European Pat. Off. . |
| 0 560 023 A1 | 9/1993 | European Pat. Off. . |
| 2059129 | 4/1981 | United Kingdom . |
| 2238152 | 5/1991 | United Kingdom . |
| 002250848 | 6/1992 | United Kingdom ................... 194/317 |
| 2250848 | 6/1992 | United Kingdom . |
| 2251111 | 6/1992 | United Kingdom . |
| 2272319 | 5/1994 | United Kingdom . |
| 2287341 | 9/1995 | United Kingdom . |
| 2288266 | 10/1995 | United Kingdom . |
| WO 92/18951 | 10/1992 | WIPO . |

*Primary Examiner*—F. J. Bartuska
*Assistant Examiner*—Bryan J. Jaketic
*Attorney, Agent, or Firm*—Fish & Richardson P.C.

[57] ABSTRACT

A method of testing coins comprising at least taking two measurements of an unknown coin: and accepting said unknown coin as corresponding to a first coin type if the point defined by the measurements lies, in the space defined by the axes of the measurements, on a first side of a discriminant surface at which the Mahalanobis distances of the centers of the distribution of said first coin type and a second coin type are in a predetermined relationship, characterized in that said relationship corresponds (at least approximately) to equality of the sums of the respective Mahalanobis distances with respective predetermined constants at least one of which is non-zero.

50 Claims, 14 Drawing Sheets

MONEY VALIDATION SYSTEM USING ACCEPTANCE CRITERIA

FIELD OF THE INVENTION

This invention relates to a validation apparatus and method for articles of value; particularly, but not exclusively, coins and banknotes.

BACKGROUND OF THE INVENTION

Such validators generally comprise a sensing system for generating two or more measurement signals, and a processing system for determining acceptability based on the signals and on stored data defining acceptability criteria corresponding to a valid type of article.

The acceptability criteria generally define an area or volume (in a measurement space defined by axes corresponding to the measurement signals) determined by, and encompassing, the statistical distribution of measurements from a population of known genuine articles.

The distributions of genuine articles may overlap with those of others, or with those of forgeries, counterfeits or slugs.

GB-A-2272319 discloses a coin validator using an acceptance region with a curved boundary.

EP-A-0367921, EP-A-0505609, U.S. Pat. No. 5,351,798 and WO-A-92/18951 disclose coin validators using acceptance regions having an ellipsoidal or circular boundary.

WO-A-92/18951, GB-A-2251111 and U.S. Pat. No. 5,351,798 disclose coin validators in which a coin is classified as one of several types in dependence upon the Mahalanobis distance (i.e. the square of the Euclidean distance in a space in which the measurements are each normalised by the variance) from the coin measurement to the center of the distribution of each type.

EP-A-0560023 discloses a banknote validator in which a banknote is accepted as genuine if its measurements define a point within a predetermined Mahalanobis distance from the center of a valid banknote distribution.

An acceptance region boundary defined by a fixed Mahalanobis distance corresponds to an ellipsoidal boundary, and also defines a contour of equal probability (assuming the distribution of genuine coins is unimodal and Normal (Gaussian)) that measurements of a genuine coin are likely to fall within the boundary.

The above-described systems may represent an advance in many areas of validation. Their operation is, however, predicated on the unspoken assumption that the probability of given measurements being associated with a particular item type (the a posteriori probability) is well correlated with the probability of an item of that type exhibiting those measurements.

SUMMARY OF THE INVENTION

We have realised, however, that under some circumstances this assumption is inaccurate. The present invention, in one aspect, is concerned with validation which takes into account factors relevant to the a priori probability to calculate the a posteriori probability rather than relying solely on measurement distributions.

In one aspect, the present invention takes into account the relative frequencies of the occurrence of different types of coins and counterfeit coins or slugs in determining the acceptance region boundary. Thus, in accordance with the invention, a coin is identified as being of a particular type not only in dependence upon the distribution of measurements from coins of that type but also in dependence on the relative frequency of occurrence of coins of that type, relative to other types.

Preferably, this leads to an acceptance boundary at a point where the relative measurement distribution probabilities of the coin being of first or second types are in a predetermined, non unity, ratio.

This therefore equates to the Mahalanobis distances to the center of the distributions of two coin types (for example a valid coin and a slug) being in a relationship corresponding to equal sums of the respective Mahalanobis distances with respective predetermined constants at least one of which is non zero.

The invention may be practised by calculating Mahalanobis distances for the first and second coin distributions and then adjusting one or both of the distances, but this is not essential.

Thus, this aspect of the invention enables an increased accuracy in discriminating particular known slug types by taking into account their probability of occurrence. Where a particular known slug type is distributed widely throughout the space represented by the measurements but occurs extremely infrequently over time, and its distribution overlaps with a genuine coin, the decision boundary is not positioned so as to bisect the distances in the measurement space from the center of the distributions of the coin of the slug, but instead is shifted further towards the center of distribution of the slug, because where a given received item of money falls into the area of measurement space in which the distribution ranges of the coin of the slug overlap (so that it could be either a coin or a slug) the fact that slugs of that type are known to be extremely rare is used to bias the decision towards deciding that the article is a coin. Conversely, where a particular type of slug is common, the decision boundary in measurement space may lie closer (as defined by the respective Mahalanobis distances) to the center of the coin distribution than the slug distribution, so as to weight the decision towards deciding that the article is a slug.

The frequency with which different slugs and/or coin types are found to occur depends not only upon the total number of such slugs or coin types in circulation but also, under some circumstances, upon the geographical location of the validator and/or upon the time of day, the day of the week or the season of the year. In embodiments of the present invention, account is taken of one or more of these factors in decided whether a given coin is valid or not.

In EP-A-0480736, an example of an anti-cheat criterion given is the use of a window just outside the normal coin acceptance window so that slugs which are close to being acceptable fall within this window. In EP-A-0520230, the same idea is employed, and the anti-cheat criterion used is a window within the acceptance region.

In another aspect of the present invention, an attempt is made to detect known slugs using an anti-cheat criterion corresponding to a slug acceptance area in measurement space, and subsequent acceptance of similar slugs is reduced by altering acceptance criteria.

In a first method of achieving this, the principles of the first aspect of the invention are employed, and the relative frequency of occurrence of the known slug is increased depending upon actual validation results. The effect of increasing the relative frequency of occurrence term is to increase the volume in measurement space within which further slugs of the same type will be identified as slugs, and therefore to decrease the volume in measurement space within which they will be accepted as genuine coins.

In an alternative method, a linear discriminant is used to determine whether a given coin is a slug, and both the slope and the position of the discriminant are altered on detection of a slug (for example, by selecting a different discriminant which reduces subsequent acceptance of similar slugs).

In a yet further method according to this aspect of the invention, detection of a slug by using one measurement is utilised to restrict acceptance of the slug in future by adjusting acceptance criteria on another measurement.

In a yet further method according to this aspect of the invention, on one or more measurement axes, a "definite slug" acceptance window is positioned, spaced apart from the coin acceptance window, so as to encompass the measurement values most likely to correspond to a slug.

It is known to provide coin or banknote validators in which the acceptance criteria are continually self adjusted or self tuned, to track changes in the sensor responses or in the characteristics of the coin or banknote population; such systems are disclosed in GB-A-2059129, EP-A-0155126, or EP-A-0480736 for example.

In another embodiment, the present invention provides alternative methods of effecting such self tuning.

In one aspect, rather than employing only measurements from within an inner range within the acceptance region to perform self tuning (as described in the above referenced EP-A-0480736) measurements from throughout the acceptance region are used, but account is taken of the probability that they represent valid coins.

Thus, account can be taken even of outlying valid coins within the population, although only relative slowly, so that sharp changes to the coin population can nonetheless can be tracked.

In another aspect, where acceptance ranges are provided for several different measurements (or, combinations of measurements), and such acceptance ranges are of different widths for each different measurement, the acceptance ranges may be adjusted in accordance with the measurements of accepted articles scaled by unequal weighting factors, which may depend upon the width of the acceptance ranges on the different measurement axes. This arrangement may under some circumstances enable more rapid tracking of changes in the coin population.

Corresponding apparatus is also provided.

Other aspects and preferred embodiments of the invention are as disclosed in the accompanying description and claims, with advantages that will be apparent hereafter.

BRIEF DESCRIPTION OF THE DRAWINGS

The invention will now be illustrated, by way of example only, with reference to the accompanying drawings in which.

DETAILED DESCRIPTION

First Embodiment

Figure 1:
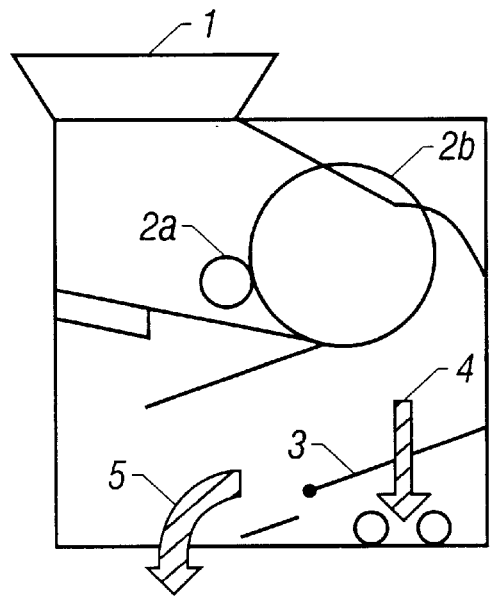
FIG. 1 is an illustrative sectional front elevation of the mechanical components of a coin validator utilised in a first embodiment of the invention, but known in itself.

Referring to FIG. 1, a coin to be validated in this embodiment enters through an inlet 1 and rolls past a sensing system 2 comprising, for example, two inductive coil sensors 2a, 2b (e.g. a sensor 2a primarily responsive to coin thickness and a sensor 2b primarily responsive to coin-diameter). In dependence upon the sensor outputs, an accept gate 3 is controlled to either direct the coin on an accept path 4 or a reject path 5.

Where multiple denominations can be recognised, further gates (not shown) are provided to selectively route an accepted coin in accordance with its denomination to one of a plurality of different stores.

Figure 2:
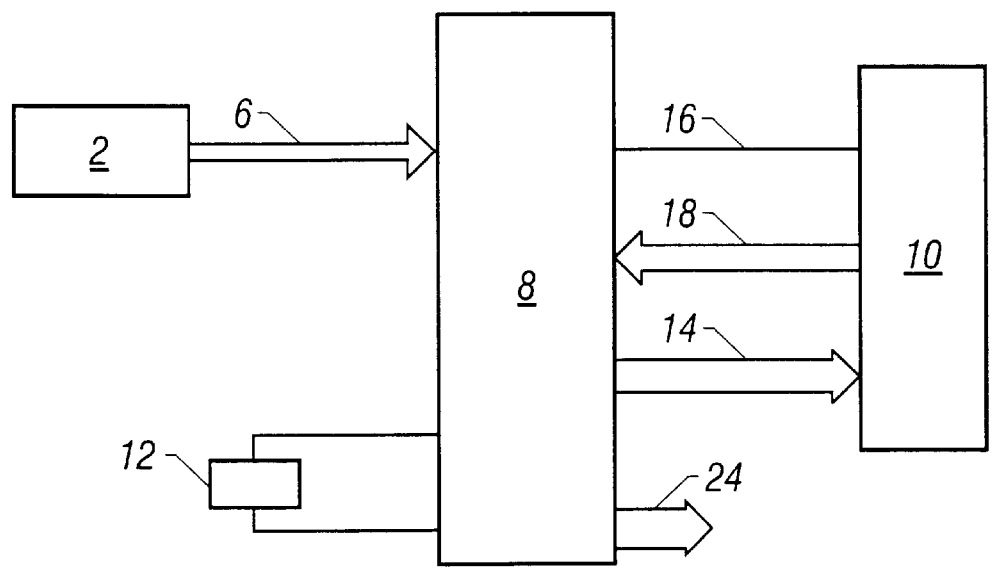
FIG. 2 is a schematic block diagram of the electrical components of the coin validator of FIG. 1.

Referring to FIG. 2, the signals from the sensing system 2 are provided on a set of lines indicated as 6 to a control circuit 8 (e.g. a microcontroller, microcomputer or microprocessor circuit; or an application specific integrated circuit (ASIC)). The control circuit 8 contains a read only memory (ROM) storing an operating programme which controls the way in which the apparatus operates.

The control circuit 8 is operable to process the measured values received on the input lines 6 with data values stored in predetermined locations in a store 10 (e.g. a programmable read only memory (PROM), which may be a single component, or multiple different components, or may be combined with the control circuit 8).

The control circuit 8 operates in response to timing signals produced by a clock 12 (which may again be integrated into a single circuit with the control circuit 8). The control circuit 8 is operable to address the store 10 by supplying address signals on an address bus 14 and an enable signal on an enable line 16. In response to the addressing operation, a data value is delivered from a store 10 to the control circuit 8 via a data bus 18.

By way of example, in this embodiment three sensors may be provided for respectively generating output signals primarily responsive to the conductivity, thickness and diameter of inserted coins. Each sensor comprises one or more coils, in a self oscillating circuit. In the case of the diameter and thickness sensors 2b, 2a respectively, a change in the inductance of each coil caused by the proximity of an inserted coin causes the frequency of the oscillator to alter, from which frequency change a digital representation of the respective coin property can be derived. In the case of the conductivity sensor (not shown), a change in the Q of the coil caused by the proximity of an inserted coin causes the voltage across the coil to alter, whereby a digital output representative of conductivity may be derived.

Alternatively, other types of sensing arrangements such as those described in our UK applications GB-A-2288266 and GB-A-2287341 or selected from a wide range of inductive, acoustic, mass, optical or other sensors, may be provided within the sensing system 2.

The control circuit 8 is arranged to perform digital arithmetic operations on the signals received on the lines 6. The sensing system 2 may comprise an analog to digital converter (ADC), or alternatively such a converter may be provided as part of the control circuit 8. In the alternative, the sensing system 2 may deliver output signals which are thresholded to be two state, and the control circuit 8 may time the transitions on the lines 6 (e.g. to derive a frequency).

The control circuit 8 is provided with output lines 24, on which a control signal is produced to control the gate 3 (and any further routing gates), and a credit signal is produced indicating denomination or value of the coin received for use by apparatus (e.g. a vending machine, a ticket sales machine, a currency exchanger or the like) to which the validator is connected.

Figure 3:
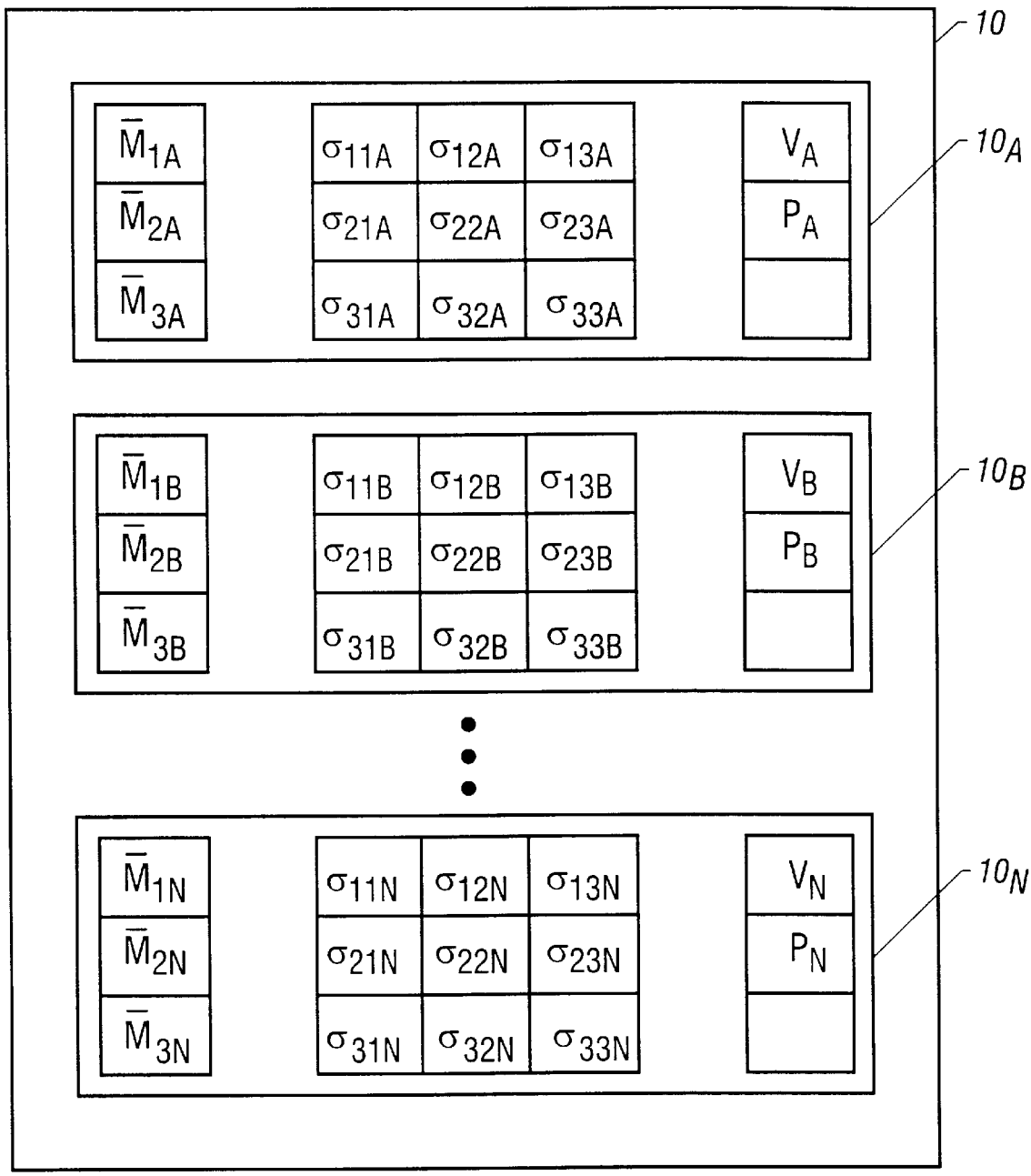
FIG. 3 is a diagram illustrating the contents of a memory of the validator of FIG. 2 in the first embodiment.

Referring to FIG. 3, in this embodiment, the store 10 stores a plurality of coin type records 10a,10b, . . . 10N. Each coin type record comprises a k-dimensional vector (where k is the number of output signals produced by the sensing system 2; in this case k=3) indicating, for the type of coin concerned, the vector of mean values $\overline{M}$ for each of the k measurements which are exhibited by a known coin population of that type. Thus, the mean vector defines the position, in the measurement space defined by the measurements, of the center of the population of coins of that type.

Also comprised within each coin type record is the (k×k) covariance matrix which describes the distribution of the coins of that type about the mean point. The diagonal terms $\sigma 11$, $\sigma 22$, $\sigma 33$ indicate the variance along each of the measurement axes $M_1$, $M_2$, $M_3$, and the non-diagonal terms indicate the covariance (a measure of the correlation) between the measurement axes in the coin population. In fact, since the covariance matrix is symmetrical, duplicate terms need not be stored.

Finally, within each type record 10a, 10b . . . 10n, predetermined constants V and P are stored. The constant V is the log of the determinant of the covariance matrix for the item type. The determinant of the covariance matrix is a measure of the volume of the distribution of coins of that type within the measurement space. The term P is, in this embodiment, a predetermined constant relating to the relative frequency of occurrence of the coin type. For instance, purely by way of example, in the UK market as a whole, the frequency of occurrence of 10 p coin may be a multiple of a frequency of occurrence of the 50 p coin, and is many orders of magnitude greater than the frequency of occurrence of foreign coins. However, in some particular locations (for example in seaports or near airports, or foreign army establishments) the frequency of occurrence of foreign coins may be much higher.

Likewise, in Germany, the frequency of occurrence of Deutschmark coins is in general much higher than that of the Estonian kroon, but at certain locations, the Estonian kroon may occur much more frequently.

In the following, the term "frequency" refers to the frequency of occurrence or distribution, rather than referring to frequencies of AC signals (which may be used in the validation process).

Also contained within each record 10a–10n is a field indicating the denomination of a coin concerned or the amount of credit to be assigned when that coin is encountered; the entry of a zero or other predetermined flag in this field indicating that the coin is a slug.

The operation of the above described embodiment will now be described in greater detail.

Figure 4A:
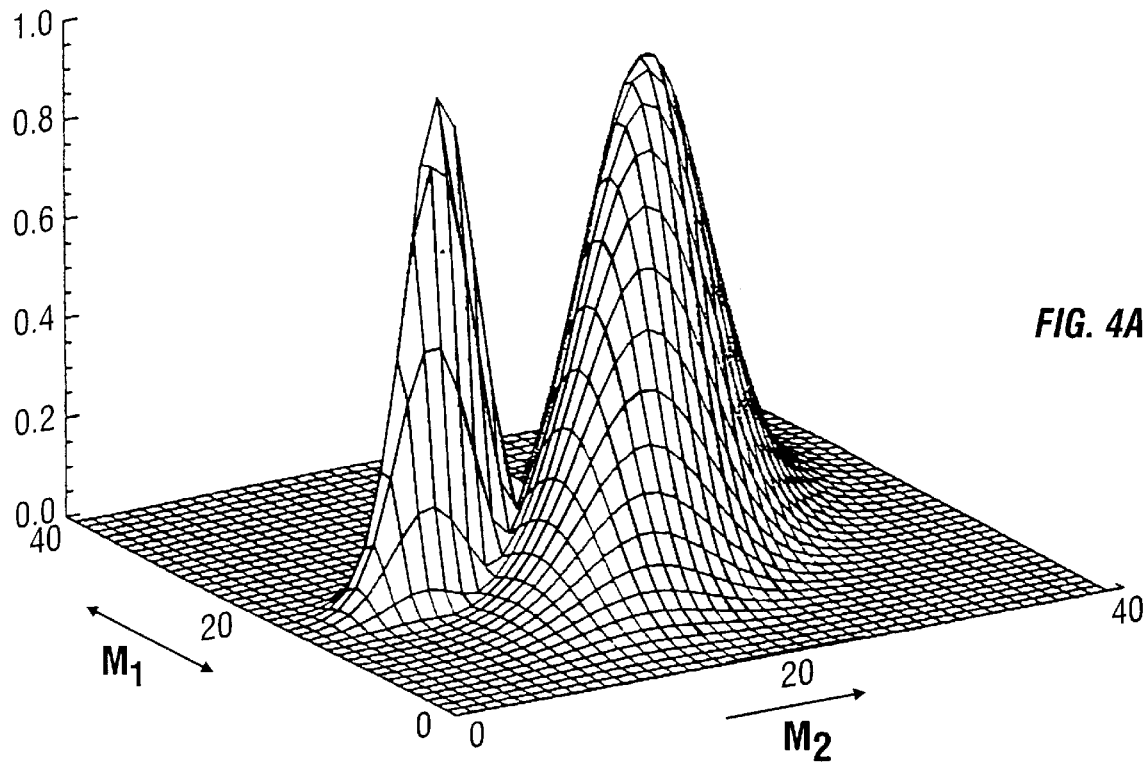
FIG. 4a is a three dimensional plot of the distribution over two horizontal measurement axes of sensor measurements from coins known to correspond to overlapping coin and slug populations, frequency or probability being illustrated on the vertical axis.

FIG. 4a is a plot showing the probability or frequency (on a vertical axis) for two types of coin A, B, over two sensor outputs $M_1$, $M_2$ (on horizontal axes). The vertical axis is normalised.

Figure 4B:
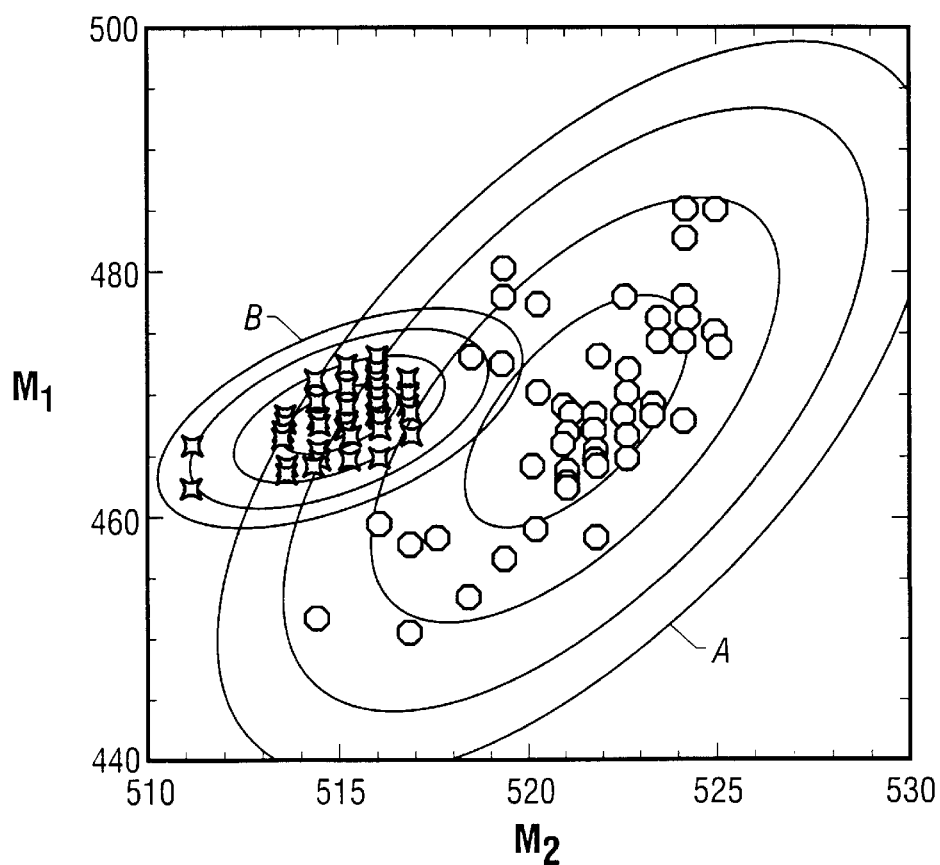
FIG. 4b is a scatter diagram showing the distribution of the coin and slug measurements of FIG. 4a on the two measurement axes.

FIG. 4b is a scatter diagram represents the same data plotted in the measurement space defined by the two sensor measurement dimensions $M_1$, $M_2$, and shows a number of frequency contours for each of the two coin types A, B. FIG. 4b therefore corresponds to a view vertically downwards onto FIG. 4a. In FIG. 4b, the dark dots are actual measurements of a random sample of the first type of coin A and the dark crosses are measurements of the second type of coin B.

It will be seen that using a first measurement M1 alone, it is impossible to separate the two types of coins since the measurements given by the center of these two distributions are very close. Separation is somewhat easier using the other measurement M2, where at least the center of the distributions are separated, but there is still significant overlap between the distributions and thus it is difficult to achieve a separation which passes a desired level (say 95%) of coin A and rejects a desired level (say 95%) of coin B.

In FIGS. 4a and 4b, the two coins are of different types and of different national currencies; thus, in a given jurisdiction, one of the coins is to be accepted as valid and the other is to be rejected as a slug. However, the following description applies equally whether the two are both valid denominations in the same currency, or valid denominations in different currencies, or one is a counterfeit coin and the other is a valid coin.

As taught in one embodiment of our earlier application WO-A-92/18951, an improved performance can be obtained by defining an ellipsoid or ellipse around the item type A. However, in this case, as can be seen from FIG. 4b, such an ellipse would not of itself necessarily give the required acceptance of type A without also accepting some coins of type B. The same problem arises with the use of a linear discriminant as taught in one embodiment of GB-A-2272319.

As mentioned in a second embodiment of WO-A-92/18951 an alternative would be to extract the measurement vector created when a particular coin to be tested passes the sensor system 2 (which corresponds to a point in the measurement space of FIG. 4b) and derive a distance value from the point to the center of each of the coin types A, B.

Each distance measurement is normalised by the variances of the respective coin class, so as to correspond to a certain number of standard deviations from each center, and hence to a certain frequency or probability level that a coin of the type in question would have given rise to the measurements. This therefore corresponds to a discriminant surface in the measurement space created at the point where elliptical contours shown in FIG. 4b, representing the same frequency occurrence for the different coin types, intersect. The discriminant therefore represents a surface where the probabilities that the coin measurements would have been created by a coin of the first type and by a coin of the second type are equal (an "equiprobability contour").

Figure 5A:
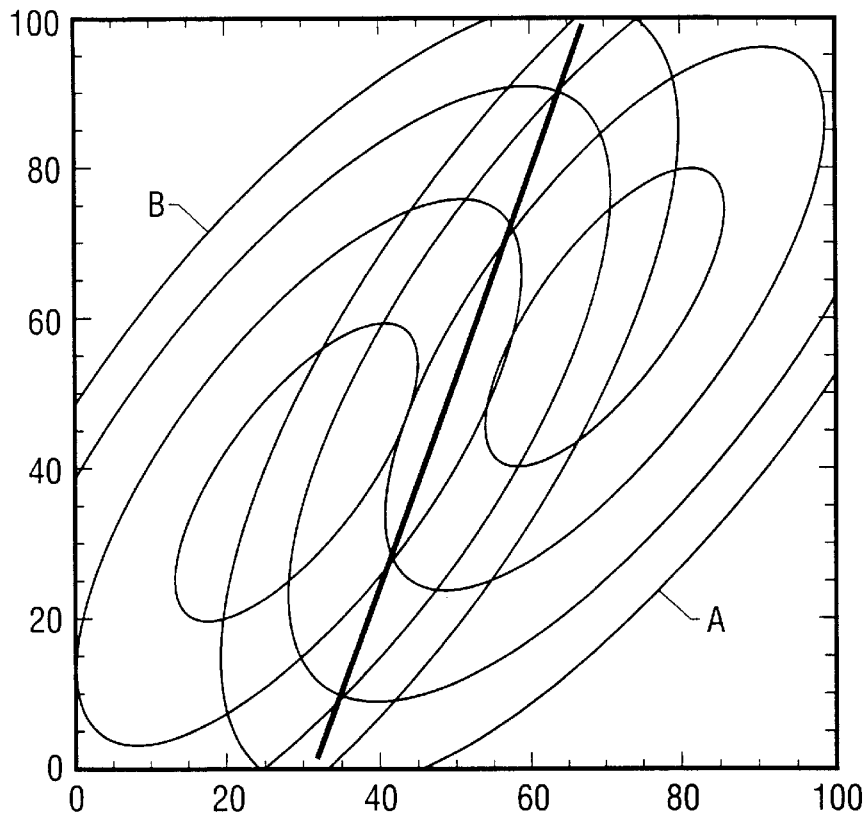
FIG. 5a is a notional view showing a discriminant plane between two exactly equal coin distributions, on two sensor measurement axes.
Figure 5B:
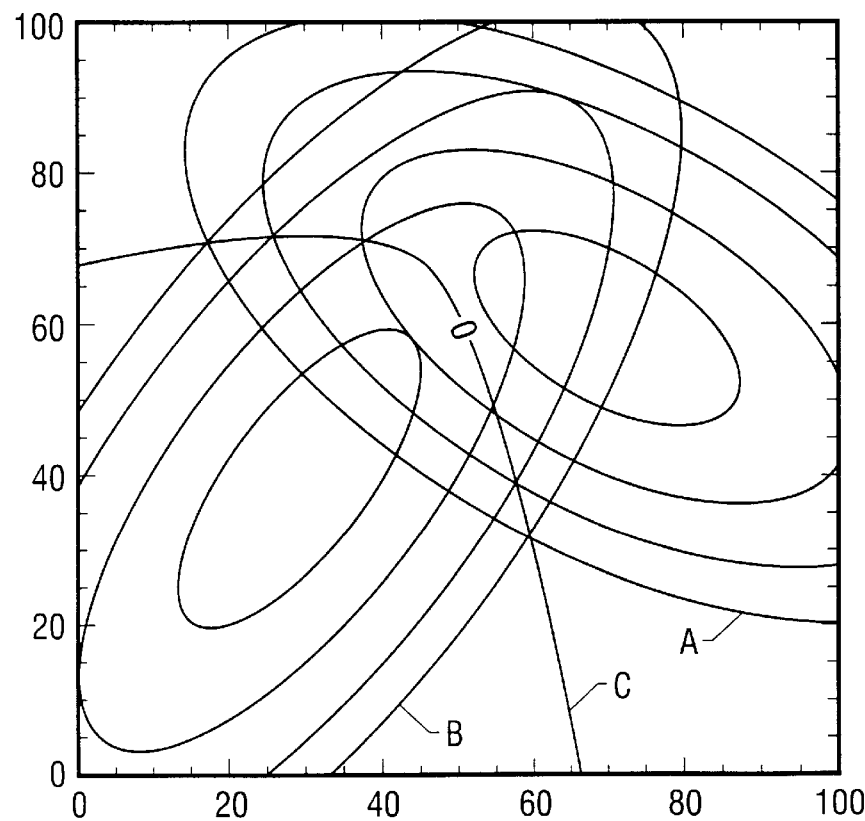
FIG. 5b is a corresponding plot for two unequal coin distributions showing a curved discriminant therebetween.

Referring to FIG. 5a, where the two types have the same distributions (i.e. for an ellipse representing, say, 2 standard deviations, the widths of the ellipses for the two coin types are the same) and the measurements between the two are similarly correlated (i.e. the two ellipses have the same inclination to the measurement axes), as is shown in FIG. 5a, such an equiprobability discriminant surface reduces to a straight line or a planar surface. Where either one, or both, of these assumptions does not hold then the discriminant surface is curved, as shown in FIG. 5b.

Thus, to perform the method described in that embodiment of WO-A-92/18951, the control circuit 8 in this embodiment would be arranged to input the sensor readings (FIG. 6 step 102); read the memory 10 (step 104); and calculate, for each coin type A, B . . . N, a distance value:

$$D_j = (X - \bar{M}_j)^T \Sigma_j^{-1} (X - \bar{M}_j)$$

where:
X = measurement vector defined by K measurements from the measurement system 2 of a coin to be validated;
$\bar{M}_j$ = mean measurement vector stored in store 10 for coin type j1
$\Sigma_j^{-1}$ = inverse covariance matrix for coin class j stored in store 10.
$( )^T$ = transpose operation
$D_j$ = Mahalanobis distance from coin measurement to center of coin type j.

It will readily be seen that, where the axes of an ellipse are parallel to the measurement axes, this resolves to the common elliptical equation:

$$D_j = (X_1 - \bar{M}_{1j})^2/\sigma_{11} + (X_2 - \bar{M}_{2j})^2/\sigma_{22} + (X_3 - \bar{M}_{3j})^2/\sigma_{33}$$

In the present embodiment, however, the distance values calculated in this way are further modified in step 106. As has been explained above, in FIG. 5a for example, the elliptical contours relating to the two coin types A or B represent, for coins known to correspond to those types, the probability that the measurements given rise to by the coin will lie within the ellipse. However, where two distributions overlap, the present embodiment makes a first adjustment to take account of the fact that the volumes occupied by the two distributions are not in general equal (as in FIG. 5b). Where a particular coin distribution occupies a large volume in measurement space (for example, the 2 × standard deviation boundary occupies a large volume in measurement space) it is likely that a given coin reading will fall into that coin's acceptance region. For example, a particularly ill-defined coin distribution might cover substantially the whole of the measurement space within the range of the sensors, but this would not make it any more likely that any given coin was in fact a member of that coin type. Accordingly, in this embodiment, a first adjustment to the above described process normalises the probability measurement, by adjusting the distance measurement thus calculated to take account of a measure of the volume $V_j$ in measurement space of the coin type concerned, which is given by:

$$V_j = \ln|\Sigma_j| \text{ where;}$$

$|\Sigma_j|$ is the determinant of $\Sigma_j$.

The distance measurement $D_j$ is proportional to the logarithm of probability, and thus the volume term $V_j$ is likewise proportional to the logarithm of the volume in measurement space of the coin type distribution.

This operation may be thought of as a normalisation, since the effect of taking the Mahalanobis distance for each coin is to transform the measurement axes into rotated and scaled axes in accordance with the covariance matrix; the operation of adding the log of the volume term (i.e. the operation of multiplying the equivalent probability by the volume term) is to normalise the transformed axes to preserve the volume of each coin type distribution.

The second stored term $P_j$ is an a priori probability or frequency term, as explained above. For example, in this embodiment, the probability terms $P_j$ for coin types corresponding to valid coins in the denomination of the country concerned are set to be proportional to the numbers of coins in circulation, whereas the probabilities for valid coins of different currencies or known slugs are set in accordance with empirically found levels (which may vary in different geographical positions).

The "probability" term $P_j$ actually stored in the store 10 is:

$$P_j = -2 \ln F_j$$

where $F_j$ is the frequency of occurrence of the coin type concerned as discussed above.

The adjusted distance measurement corresponding to the probability that a given coin is represented by the measurements is therefore calculated in step 106 as $AD_j = D_j + V_j + P_j$. Thus, the Mahalanobis distance is corrected by, effectively, multiplying the corresponding measurement probability by the actual expected probability of occurrence of the coin concerned.

Referring once more to FIG. 5a, merely using the linear discriminant shown therein (corresponding to equal Mahalanobis distances) would entail recognising a given measurement vector as corresponding to one of the two classes, depending on which side of the discriminant line it fell, regardless of whether one of the classes occurred a thousand times more commonly than the other.

In practice, if one type of coin is far more frequently available than another, then a given set of measurements would, all other things being equal, be expected to correspond to the more frequently occurring coin type. Thus, the effect of subtracting the logarithm of the a priori probability or frequency of occurrence term from the distance is to divide the distance by the squared frequency of observance and hence to multiply the corresponding distribution probability by the square of the a priori frequency of occurrence term $F_j$.

Having calculated an adjusted distance measurement $AD_j$ for each coin type j ($AD_j=D_j+V_j+P_j$) (step 108) the coin class associated with the shortest adjusted distance thus calculated (i.e. highest probability) is selected as corresponding to the test coin (step 110). If the coin class corresponds to a valid coin type, the control circuit 8 issues an accept signal and indicates the credit value on the lines 24 (step 112). If the coin type corresponds to a foreign coin or a slug, the control circuit 8 issues a reject signal on the lines 24 (step 112).

The effect of selecting the shortest distance corresponds to the use, in the space defined by the measurement axes, of discriminant surfaces running between the center of distributions of valid coins and known slugs, each discriminant surface being such that, at any point on the surface, the ratio of the Mahalanobis distances to the center between which the surface discriminates is constant. In the event that two coin or slug populations had identical a priori probabilities and volumes, this ratio would be unity, corresponding to the embodiments described in WO-A-92/18951 or U.S. Pat. No. 5351798. However, although discrimination could be performed on this basis, the use according to the present embodiment of different volume terms and/or different a priori probabilities for different types of coin or slug will result in the ratio being non-unity.

In this embodiment, numerous modifications and variations are possible. For example, the store 10 may contain multiple probability terms $P_j$, one for each of a number of different countries (or, in general, geographical locations), and the control circuit 8 may contain an input (for example a switch not shown) for selecting a country (or location). Thus, the same mean, covariance and volume data are stored for all countries, but the frequencies of occurrence are different in different countries (to take account of the fact that generally speaking the valid coin set of a country is more frequently occurring in that country than that of other countries) and the control circuit 8 is arranged to accept different coins as valid and indicate their denominations in different countries (so that the valid coins of one country are recognised as slugs in a different country).

The data stored in the store 10 may not be the actual values of the mean and covariance matrices but could be functions or derivatives thereof. In particular, where only a single, fixed, a priori probability or frequency term $P_j$ is employed for each coin denomination, the constants $P_j$ and $V_j$ may be combined as a single constant and, furthermore, the means and/or covariance coefficients may be stored in a form which is already normalised by these constants (or derived data) thus making their separate storage unnecessary.

It will readily be recognised that the effects of the volume and frequency terms are independent, and that some advantage can be obtained from each in isolation of the other.

Many other variants on this embodiment will occur to the skilled person.

Second Embodiment

The above described embodiment is intended to distinguish accurately between a number of different coins, and between coins and known types of slug. However, in practice it is possible that new or unknown types of slug may be inserted into the mechanism. To guard against this, in addition to the above described process of FIG. 6, an additional test is performed to determine whether the coin measurements define a point which lies within an acceptance volume in measurement space.

Figure 7:
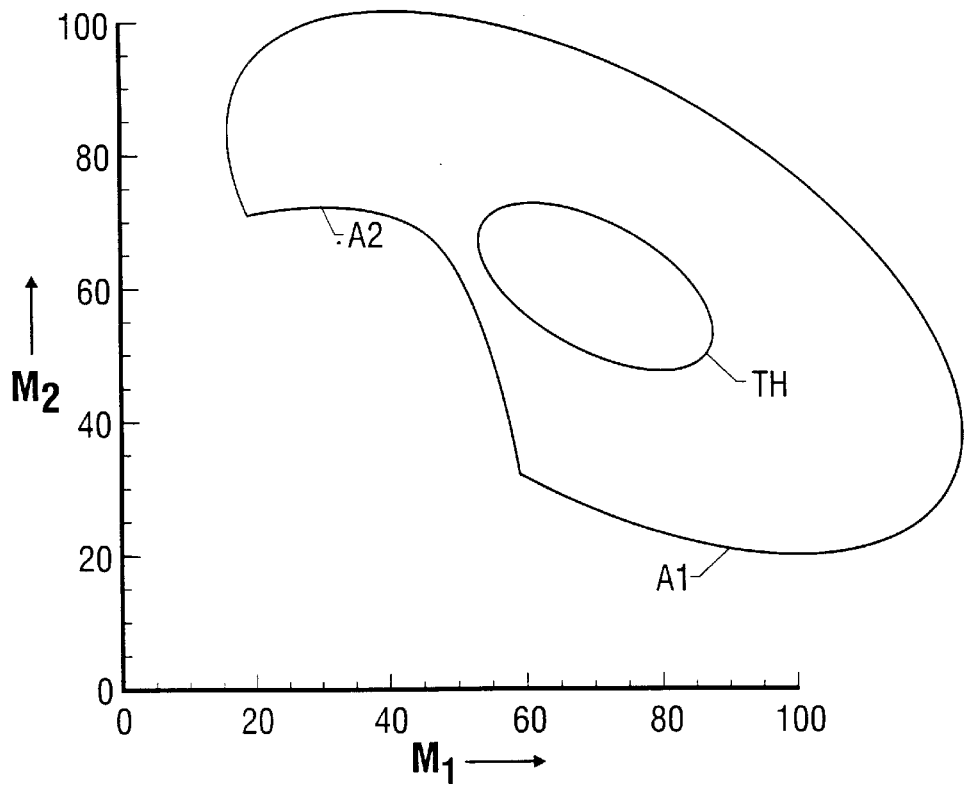
FIG. 7 is a plot showing an acceptance region in a second embodiment of the invention and corresponding to FIG. 5b.

Referring to FIG. 7, the curve A1 denotes an acceptance window defined by a contour at which the adjusted distance AD corresponds to a 95% probability level. The curve segment A1 is therefore ellipsoidal. It intersects the equiprobability discriminant contour A2, which is defined by a quadratic equation as discussed above.

Figure 6:
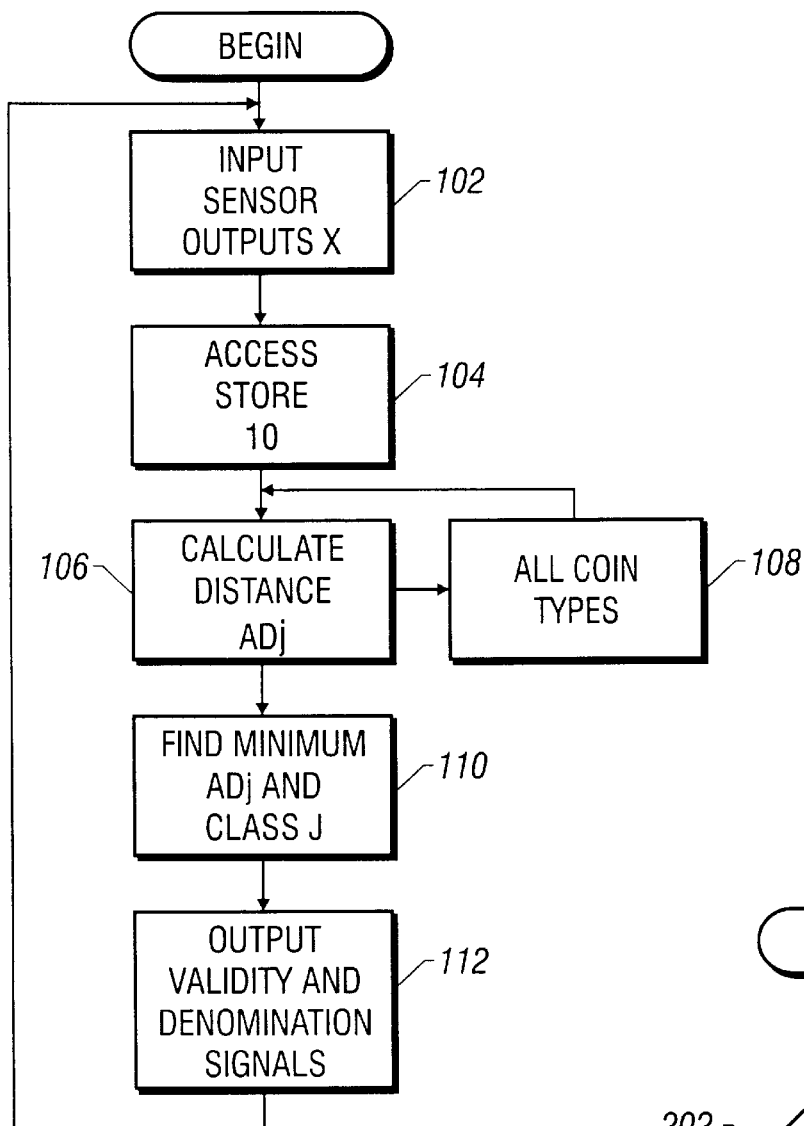
FIG. 6 is a flow diagram illustrating the operation of the control circuit of FIG. 2 in the first embodiment.

The volume encompassed by the curved segments A1 and A2 may simply be used as the acceptance volume by testing the adjusted distance $AD_j$ selected in step 110 in FIG. 6 against a fixed threshold corresponding to the desired acceptance probability in a further step 111 (not shown) following step 110, and rejecting the coin if it lies outside the acceptance region defined by the elliptical line segment A1 corresponding to the fixed threshold.

It is equally possible to define the acceptance region in other manners. For example, rather than testing the adjusted distance $AD_j$ against a fixed threshold as described with reference to FIG. 7, the Mahalanobis distance D could be tested to achieve exactly the same result.

Figure 8:
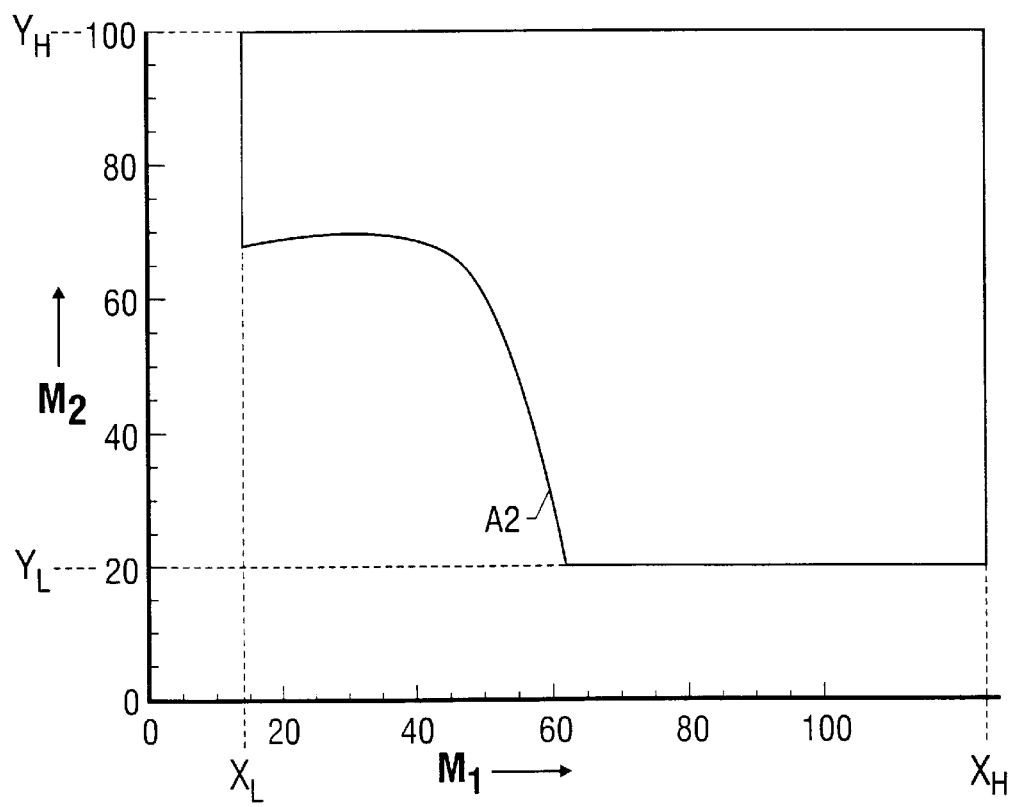
FIG. 8 shows an alternative acceptance region to that of FIG. 7 in the second embodiment.

Alternatively, referring to FIG. 8, the acceptance region could be defined by upper and lower thresholds $X_h$, $X_1$, for measurement $M_1$ and $Y_h$, $Y_1$ for measurement $M_2$, as shown in FIG. 8, to define a rectangular (or, for multiple measurement axes, cuboidal) acceptance region. In this case, in the step 111, the sensor readings $M_1$, $M_2$ . . . are each tested against respective stored upper and lower thresholds for the denomination of coin selected in the step 110.

Equally, other types of acceptance region (for example as discussed in GB-A-2238152) could be employed.

In the process illustrated in FIG. 6, the most likely coin class is selected in step 110 and then, as discussed above, a further acceptance test (not shown) may be performed.

Figure 9:
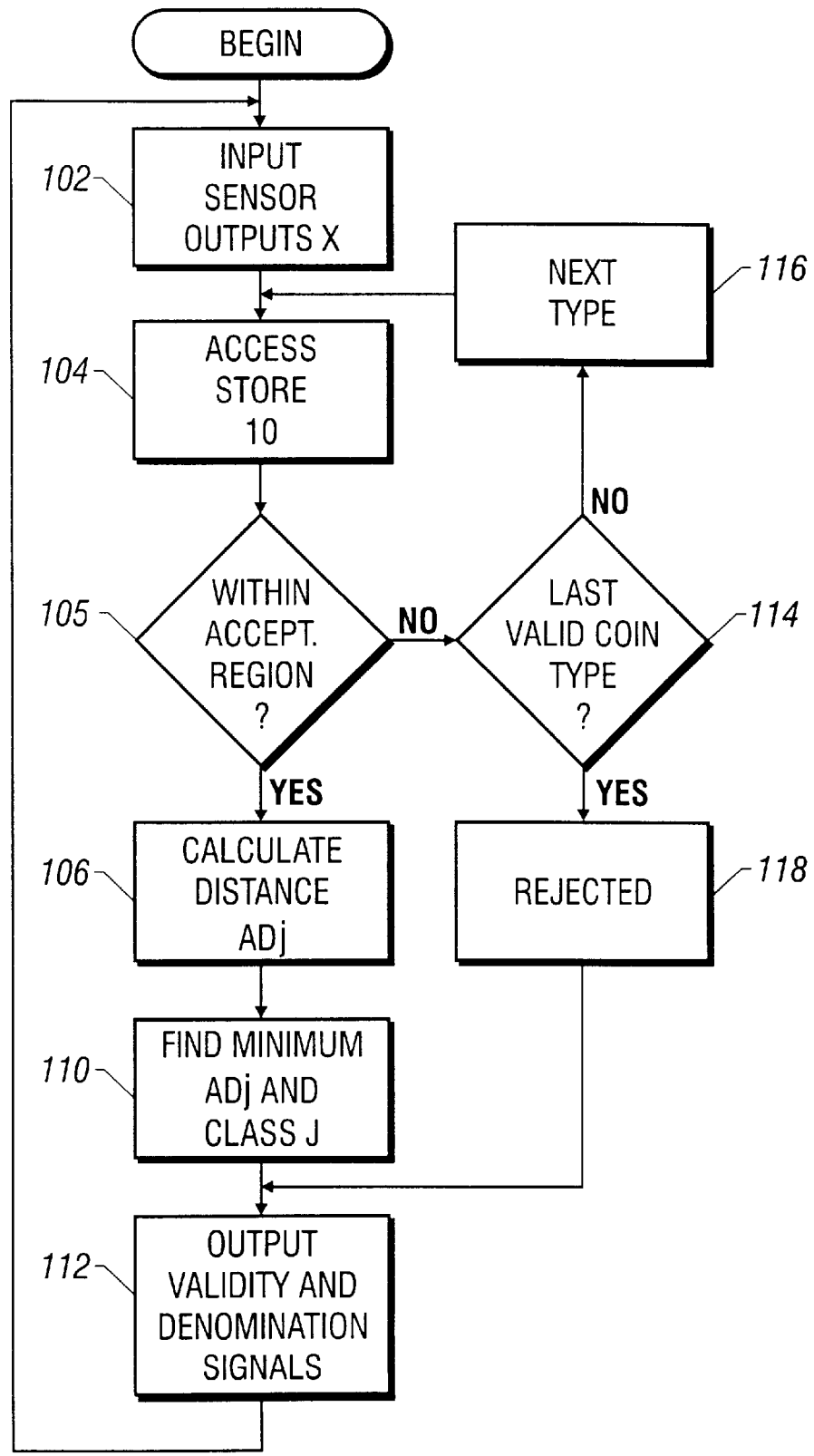
FIG. 9 is a flow diagram showing the operation of the control circuit of FIG. 2 in the second embodiment.

However, referring to FIG. 9, in this case the memory 10 stores reference data defining an acceptance boundary for each valid coin denomination (for example in the form of a fixed threshold defining a curve A1 as in FIG. 7 or upper and lower thresholds for each measurement as in FIG. 8).

After accessing the store in step 104 to read the reference data, in a step 105 the control circuit 8 determines, for the denomination concerned, whether the measurements lie within the acceptance volume defined by the reference data.

If not, in steps 114 and 116 the control circuit 8 returns to step 104 to read the reference data for a further type of valid coin until (step 114) the last valid coin type is reached.

In this case, the coin does not lie within the acceptance region for any valid coin and is therefore considered in step 118 to be rejected. Following step 118, the control circuit returns to step 112 to output the validity signal which indicates rejection of the coin.

When a coin is detected to lie within the acceptance region for a valid coin type (step 105), the control circuit 8 then calculates the adjusted distance AD for that coin type j and for other coin types (including known slug types) the distributions of which overlap the acceptance volume for that coin type. Then, in step 110, the minimum of these adjusted distances is selected.

Thus, step 110 performs a determination as to whether the adjusted distance to the already selected valid coin type is shorter than the adjusted distance to the center of any other coin type, which corresponds to a determination of which side of the discriminant surface A2 of FIG. 7 or 8 a given coin lies on.

In the event that the coin lies closest to the valid coin distribution already determined, in step 112 the control circuit 8 outputs a signal indicating that a valid coin of that denomination has been determined; otherwise, the control circuit 8 outputs a signal indicating that an invalid coin has been detected.

Thus, the arrangement of FIG. 9 may be used where multiple coin types are to be detected, and only a limited number of the coin types (for example only a single coin type) are confusable with a known slug. Initial coin classification may be performed by simple comparison operations as illustrated in FIG. 8, and the adjusted distances need be calculated only for the single coin type and the slug type with which it is confusable, and only when it is determined in step 105 that the coin under test corresponds with this coin type.

Third Embodiment

Figure 10:
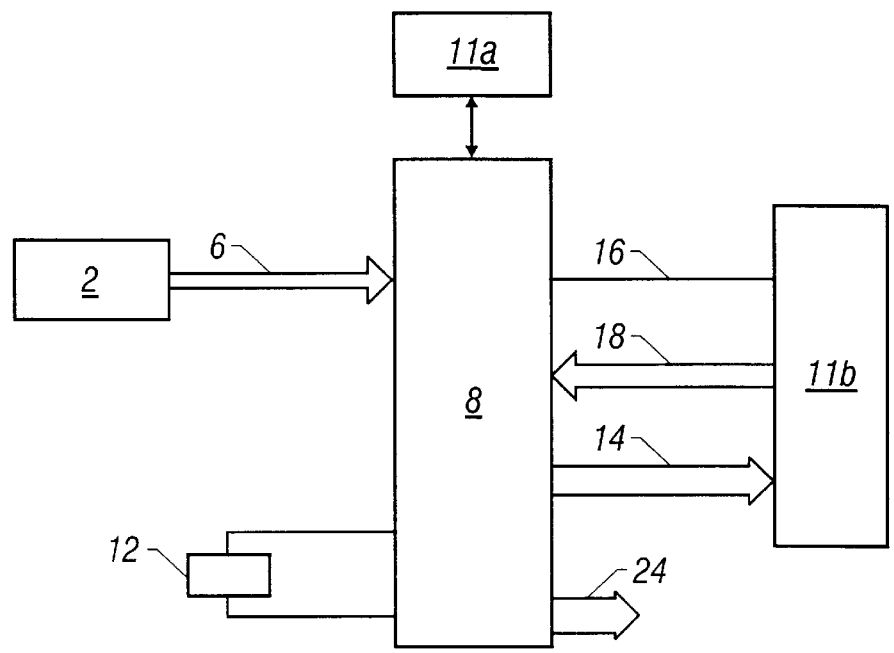
FIG. 10 is a schematic block diagram illustrating the electrical components of a coin validation apparatus of a third embodiment of the invention.

Referring now to FIG. 10, a third embodiment of the invention will be disclosed.

In this embodiment, the performance is improved by taking account of time varying conditions.

In this embodiment, components having the same reference numerals are the same as in the first embodiment and will not be described further.

In this embodiment, the store 10 is replaced by a random access memory (RAM), electrically programmable read only memory (EPROM), or other type of re-writable memory 11b, and there is provided a start up ROM 11a. The start up ROM 11a contains, in this embodiment, the same data as disclosed in the above embodiment in relation to FIG. 3.

However, in this embodiment the control circuit 8 is arranged to read the data stored in the start up ROM 11a on power up, and to write it into the writable store 11b. All subsequent validation is performed with reference to the data in the writable store 11b, the start up ROM 11a being utilised only where power is subsequently lost. (The start up ROM 11a may be incorporated into control circuit 8 if desired).

The mean, covariance, volume and probability data for each coin class are therefore available for "self tuning" adjustment of the measurement boundaries as described in GB-A-2059129, or EP-A-0155126. Accordingly, in this embodiment, after acceptance of a coin as corresponding to a given coin type, the control circuit 8 is arranged to utilise the coin measurement vector X to change the mean vector $\overline{M}_j$ for the coin type concerned.

Preferably, for the reasons disclosed in EP-A-0480736, only those coins which have a high probability of corresponding to the coin type concerned are utilised in updating the means of the coin type. This may be achieved in several ways, for example:

1. Updating of the mean is only performed where the adjusted distance AD is less than a predetermined level TH, corresponding to the inner ellipse shown in FIG. 7;

2. Updating is only performed where the Mahalanobis distance D is less than a predetermined level (this is equivalent to (1) above);

3. Updating is only performed when the Euclidean distance, Manhattan (city block) distance, or some other distance metric in measurement space is less than a predetermined level, or the measurement lies within a predetermined acceptance volume defined in some other way;

4. Updating is only performed when the difference between the shortest adjusted distance and the next shortest adjusted distance exceeds a predetermined margin.

The last of these methods has the advantage that it allows the use of coins which are relatively far away from the center of the coin type distribution, but are nonetheless unambiguously coins of the correct type because they have a low probability of corresponding to any other type.

On the other hand, the use of one of the earlier three methods has advantages in providing that the coins to which the self tuning adjustment are responsive are evenly distributed in all directions in measurement space.

Figure 11:
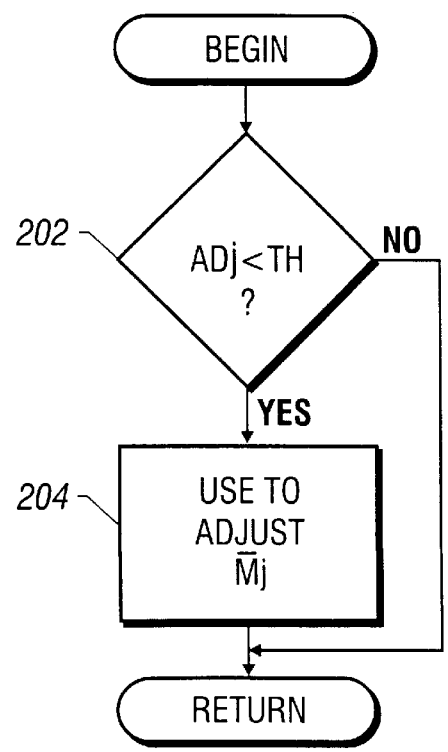
FIG. 11 is a flow diagram modifying the operation of FIG. 6 in the third embodiment.

In the present embodiment, the first of the above methods is used, as illustrated in FIG. 11, which follows conveniently after step 112 of FIG. 6. In step 202, the adjusted distance AD corresponding to the coin class accepted in step 110 is tested against a threshold TH illustrated in FIG. 7. If the adjusted distance is less than the threshold (i.e. the coin measurements lie within the inner ellipse TH in FIG. 7) then the coin measurements are used to update the mean in step 204; otherwise, the mean is left unadjusted.

It is also possible to recalculate the covariance matrices (and volume terms) for each accepted coin, as disclosed in GB-A-2059129 or EP-A-0560023. Details of the manner of adjustment of the means are given in any one of the above referenced earlier applications, incorporated herein by reference.

Fourth Embodiment

The a priori probabilities P may also change over time, for example if a deliberate and sustained attempt is being made to "slug" the coin mechanism by repeated insertion of slugs, either in the hope of accidental acceptance or in the hope of retraining the validator to accept slugs though the self adjusting action.

In EP-A-0480736, it is disclosed that attempts of this kind may be defeated by testing inserted coins against anti-cheat criteria, which label the inserted coin as a slug and, after insertion of one or a predetermined number of such slugs, adjusting the acceptance boundary to reduce further acceptance of such slugs temporarily.

In the present embodiment, a similar outcome is achieved by altering the a priori probability term $P_j$ on detection of a slug or a succession of slugs or possible slugs, since we have observed that after insertion of one slug there is a correspondingly increased probability of insertion of further slugs or reinsertion of the same slug.

Figure 12:
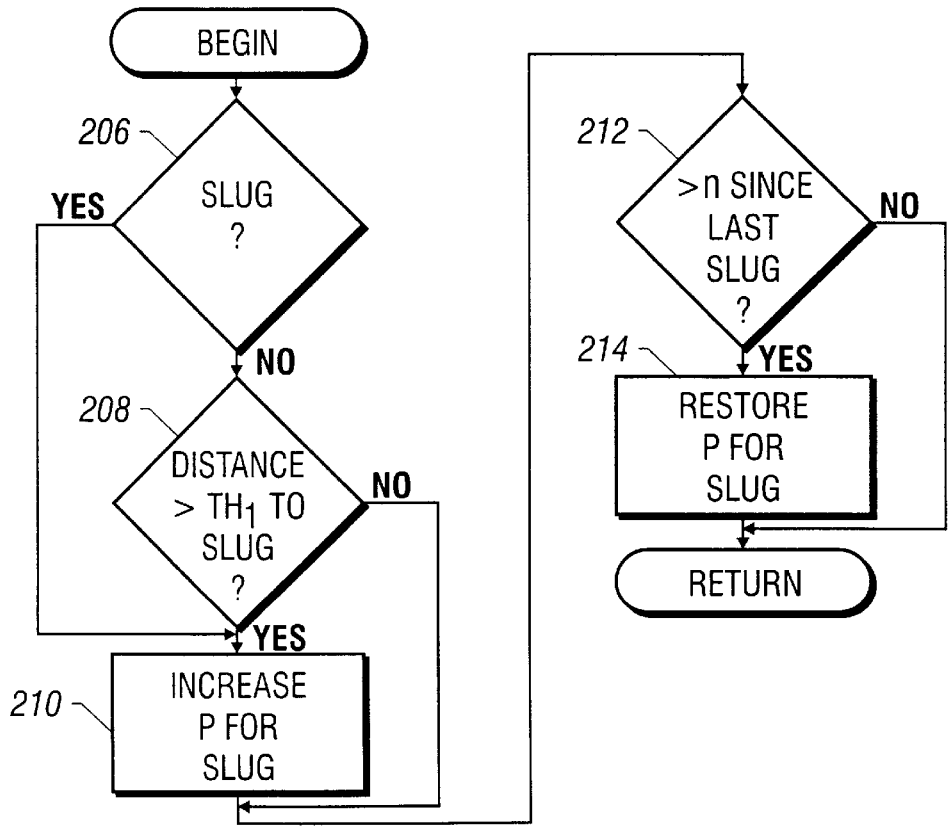
FIG. 12 is a flow diagram showing the operation of the control circuit of FIG. 10 in a fourth embodiment of the invention.

In this embodiment, the apparatus is as shown in FIG. 10 and the process of validation is generally similar to that shown in FIG. 6 (preferably incorporating FIG. 11), but is modified by the process of FIG. 12, which conveniently follows step 112.

As shown in FIG. 12 if (step 206) the just received coin is classified as a slug (i.e. a known forgery coin type or a coin type corresponding to a foreign coin set) it is utilised in a step 210 of increasing the a priori probability P for that slug class. For example, the constant P may be increased by a predetermined increment (or multiplied by a predetermined factor) on each occasion when such a slug is detected, or a counter counting the number of slugs within the last (say) thousand coins may be incremented and the probability P may be adjusted when the counter reaches a predetermined threshold.

If the coin is not classified as a slug (i.e. it is nearer to a genuine coin than to any of the slugs) but nonetheless the adjusted distance AD to the slug (or the Mahalanobis distance D to the slug) is less than a predetermined threshold of acceptability (step 208) the coin is likewise used to adjust the a priori probability (step 210).

If neither of these criteria applies, in other words if the coin is unlikely to be a slug and has been accepted as valid, in step 212 the control circuit 8 tests whether at least n coins have been accepted since the last slug or possible slug (steps 206 and 208) and if the number of coins is greater than the threshold number m, the control circuit 8 reads the ROM 10a and replaces the current a priori probability for the slug in the store 10a with the original value from the store 10b.

Various modifications to the above described process are possible. For example, rather than waiting for n coins in step 212 and restoring the original a priori probability in step 214, the a priori probability for a slug could be decremented on each occasion when a valid coin was detected. Equally, rather than increasing the a priori probability on each occurrence of a detected slug, the probability could be increased when the difference between the number of detected genuine coins and slugs exceeds a predetermined level or when the ratio of accepted genuine coins to detected slugs exceeds some predetermined level.

Rather than reloading an initial a priori probability $P_j$ for a slug class and then increasing the probability when slugs of that class are detected, it may be preferable to store in RAM 10a a relatively high probability value and then decrease the probability if no slugs are detected after a predetermined time. This therefore discourages criminals from switching off the mechanism in order to increase in acceptance of slugs.

Rather than using the above described techniques of the first or second embodiments to detect slugs, other criteria could be used to detect slugs; for example, acceptance regions defined as disclosed in GB-A-2238152 could be used.

The increment (or scaling factor) $\Delta P$ by which the a priori probability is adjusted may, rather than being a constant, be determined in accordance with the probability that the inserted coin is a slug. For example, the amount by which the a priori probability is adjusted may be inversely proportional to the adjusted distance AD to the center of the slug population, or inversely proportional to the Mahalanobis distance thereto, so that the more likely the coin is to be counterfeit the greater effect it has on restricting the subsequent acceptance of similar counterfeit coins.

Thus, in this embodiment, on detection of a coin which meets a counterfeit criterion (i.e. which is either classified as a slug or has a high probability of being a slug) the a priori probability of identifying the same or further similar coins as slugs of the same type is increased. This has the effect of reducing the region of measurement space in which such coins will be accepted as valid coins, as in our above disclosed European patent application EP-A-0480736.

It will be clear that, in the third and fourth embodiments, the two features of modifying the mean (and, if necessary, the covariance statistics) of each coin type on the one hand, and temporarily restricting acceptance of slugs on the other, could be used independently of each other and of the first or second embodiments.

Fifth Embodiment

In the above described embodiments, for K=2 sensors, the calculation of the adjusted distance AD requires, for each coin, a quadratic equation which can be achieved in eight additions/subtractions and six multiplications.

Whilst this is likely readily to be achievable, it is possible in an alternative embodiment to represent the discriminant surfaces by piecewise-linear approximations.

Figure 13A:
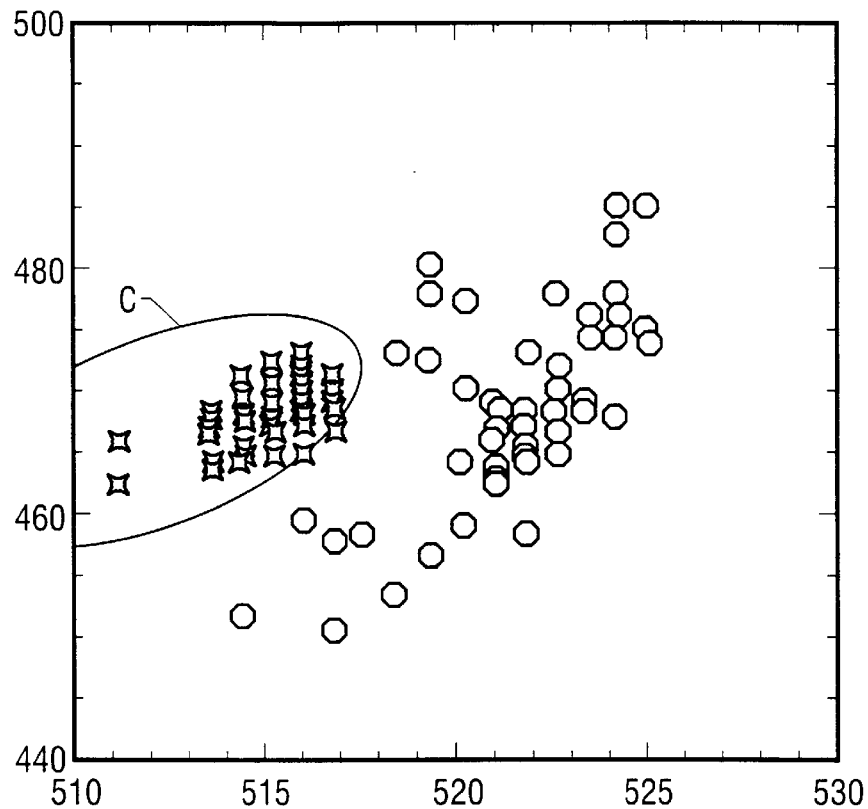
FIG. 13a is a scatter diagram corresponding to FIG. 4b and showing a curved discriminant C.
Figure 13B:
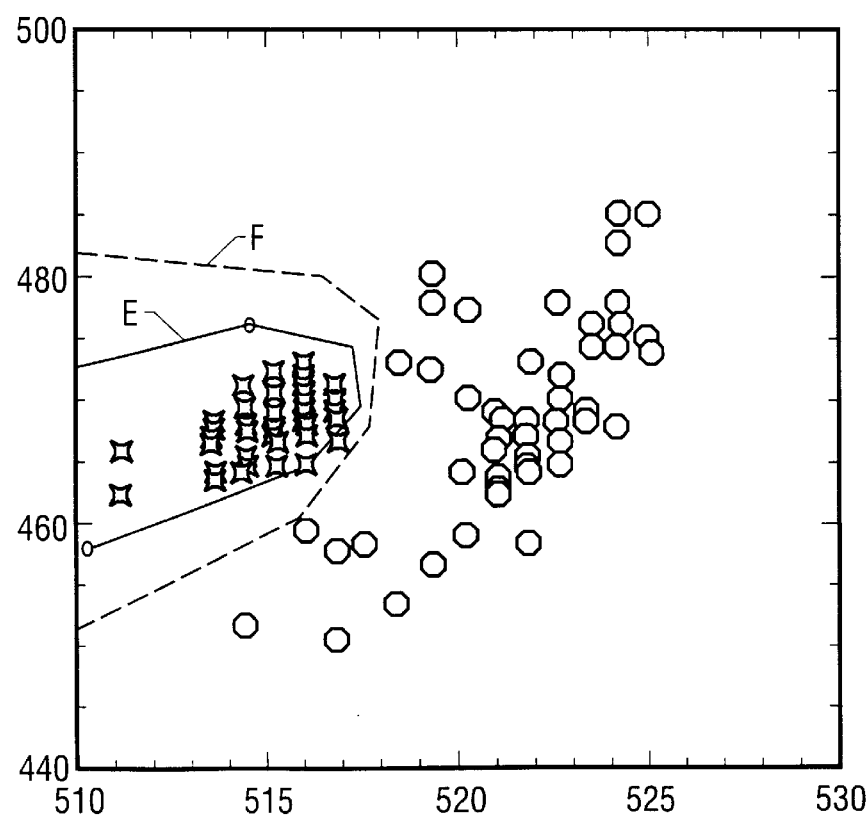
FIG. 13b is a scatter diagram corresponding to FIG. 13a and showing first and second piecewise linear approximate discriminants used in a fifth embodiment of the invention.

FIG. 13a illustrates the quadratic discriminant C corresponding to equal adjusted distances for the two coin types shown in FIG. 4b and FIG. 13b indicates (line E) a corresponding piecewise linear approximation as a solid line. In this embodiment, rather than calculating a distance to the center of each coin type, the boundaries between each coin type are stored as piecewise linear equations represented, for example, by coefficients $K_1$ and $K_2$ in the equation $M_1 = K_1 \cdot M_2 + K_2$, and each coin to be tested is classified by determining, for each discriminant between two coin types (such as E in FIG. 13b), on which of side the discriminant the coin lies as taught in GB-A-2238152.

In this embodiment, the process of FIG. 12 is modified to omit step 208. When the test of step 206 is met (i.e. a coin is classified as a slug), an alternative linear discriminant or set of linear discriminants approximating, piecewise, the slug/coin boundary are selected, as indicated at F in FIG. 13b. The lines F approximate a discriminant which would correspond to equal adjusted distances (and hence probabilities) between the slug and coin in the second embodiment, subsequent to increasing the a priori probability for the slug class in step 210.

It will be seen that, in each of the line segments, in general the slope, length and position of the line segments in the discriminant F are different to those in the discriminant E.

Thus, in this embodiment, the same effect as in the second embodiment is provided by storing alternative linear discriminants approximating the quadratic discriminants with different a priori probabilities in the second embodiment and selecting required discriminants.

Sixth Embodiment

Figure 14:
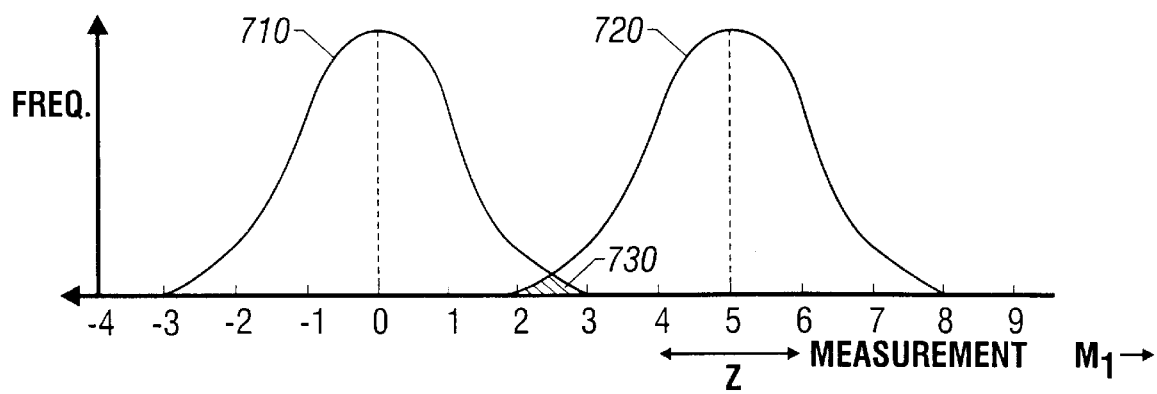
FIG. 14 is a plot of frequency (on a vertical axis) against one coin sensor measurement (on a horizontal axis) for overlapping coin and slug classes and illustrates acceptance windows used in a sixth embodiment.

Referring to FIG. 14, in a further embodiment the step of recognising a definite slug which is performed in step 206 of FIG. 12 is extended to other types of validator (for example that disclosed in EP-A-0480736, or GB-A-2238152).

In this embodiment, the coin mechanism is substantially as described with reference to FIGS. 1 and 2. However, the store 10 stores upper and lower window limits defining an acceptance window for one or more types of coin. One such acceptance window runs from −3 to +3 in FIG. 14, and the corresponding frequency distribution of coins (corresponding in one dimension to that shown in FIG. 4a) is labelled 710. As shown, it overlaps in a region 730 a frequency distribution 720 corresponding to a known type of slug, which is centered at measurement value +5.

Thus far, the apparatus of this embodiment described corresponds to that known from GB-A-2093620 and EP-A-0480736, incorporated herein by reference. The present embodiment provides, additionally, stored window data defining a window z to detect inserted items which fall centrally within the distribution of known slugs and hence are likely to correspond to known slugs. This window will be seen to be located some distance from the edge of the coin window from −3 to +3.

Figure 15:
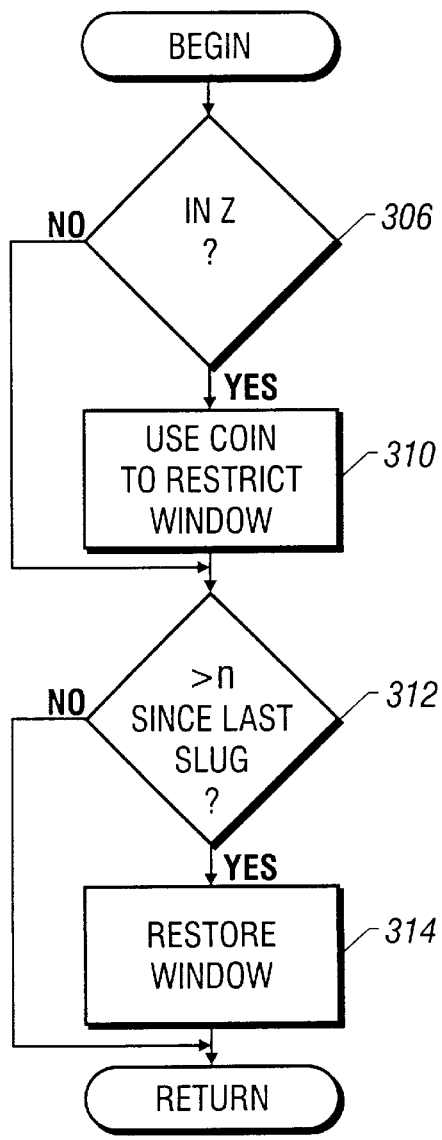
FIG. 15 is a flow diagram illustrating the operation of the sixth embodiment.

After performing the coin validation operation as disclosed in GB-A-2093620 or EP-A-0480736, the process of FIG. 15 is carried out on each coin. In step 306, the control circuit 8 tests whether or not the coin measurements lie within the upper and lower acceptance limits defining the "definite slug" window z. If not, then the control circuit 8 proceeds to step 312. If the coin measurements do fall within the window z, operation proceeds to step 310, to cause the reduction of acceptance of slugs by modifying the acceptance window around the valid coin distribution 710.

In step 310 in this embodiment, the upper window limit is restricted from +3 to +2 on detection of a slug in the slug window z.

Thus, it is not the (relatively rare) slugs which are in the tail of the slug distribution in the overlap region 730 which trigger the narrowing of the coin acceptance window in a step 310, but the slugs which show measurements some distance from genuine coins but which are definitely counterfeit (step 306).

This is nonetheless advantageous since by detecting coins which are definite slugs, an attempt to "slug" the validator may be detected at an earlier stage, and hence is less likely to be successful, than if the step 310 is deferred until a random insertion leads to measurements in the region 730.

In this embodiment, as shown, a count is kept of the number of genuine coins since the last detected slug and, in step 312, the number is tested against a threshold n and the original window is restored in a step 314 after n valid coins have been detected.

Rather than triggering the window modification step 310 on each detection of a definite slug, the detection step 306 may lead to the incrementing of a counter (in practice performed by the control circuit 8) and the step 310 may be performed when the count reaches a certain threshold value. The acceptance of a certain number of valid coins may act to decrement the counter.

Seventh Embodiment

Figure 16:
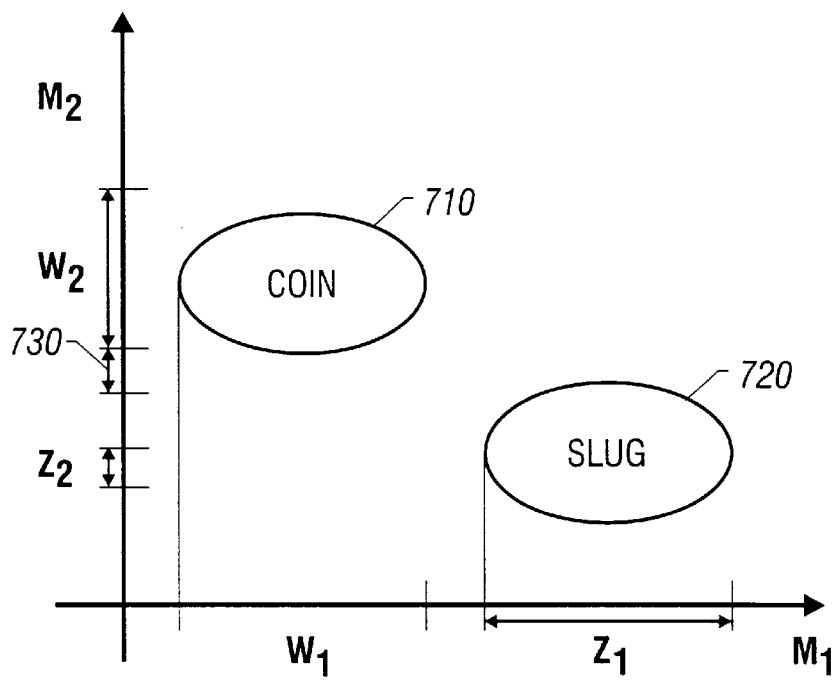
FIG. 16 is a plot on two sensor measurement axes showing coin and slug distributions which may be discriminated in a seventh embodiment.

In the above described embodiment, detection of a slug is performed on one measurement parameter $M_1$ and the results of the test on that parameter are used to control the acceptance window on that same parameter. However, it will be clear from the foregoing that this is not necessarily the most preferred method of operating the invention. For example, in FIG. 16, coin population 710 is well separated from slug population 720 along a first axis $M_1$, but is badly separated along another measurement axis $M_2$. Thus, it is difficult to separate the two populations using only measurement $M_2$.

As an alternative to using a narrow "definite slug" window $z_2$ to detect the slug using measurement $M_2$, a slug window $z_1$ may be provided and the measurement $M_1$ tested against it. If a slug is detected because the measurement $M_1$ falls within the band $z_1$ then this is used in step 306 additionally to, or alternatively to, the window $z_2$, to restrict the coin window $w_2$ to exclude the region 730 on measurement $M_2$.

Eight Embodiment

Figure 17:
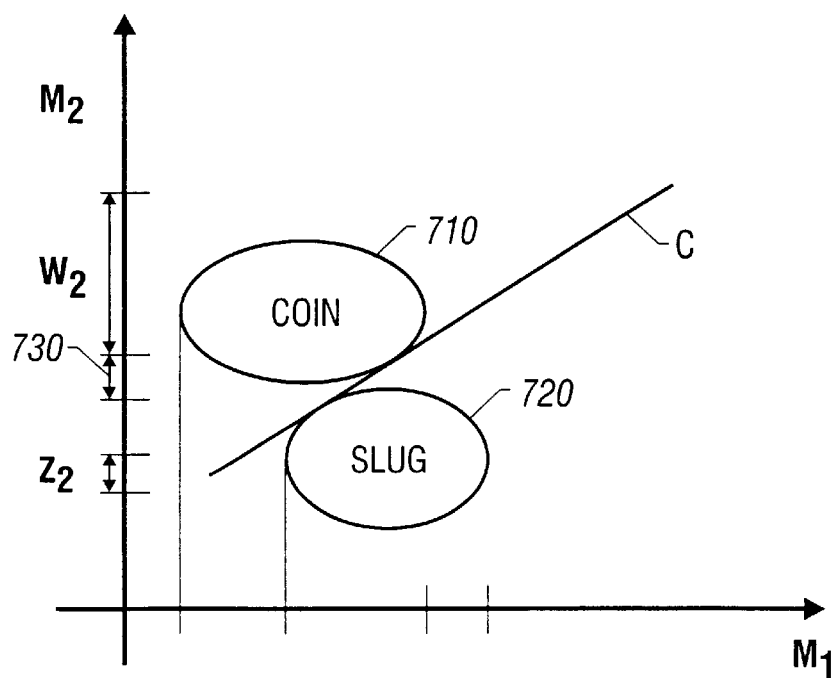
FIG. 17 is a plot on two sensor measurement axes showing coin and slug distributions which may be discriminated in an eighth embodiment.

Referring to FIG. 17, under some conditions the slug distribution 720 and the coin distribution 710 may be difficult to separate using any single measurement $M_1$, $M_2$ or $M_3$. Accordingly, as taught in one embodiment of GB-A-2238152, a linear discriminant G may be employed by calculating a linear combination of two measurements $M_2$ and $M_1$ so as to achieve separation between the coin class 710 and slug class 720.

In a further embodiment, this discriminant surface is employed to switch between broad and narrow windows on one or more measurements. Accordingly, in this embodiment a linear combination $aM_1 + a_2 M_2 + a_3$ is formed and tested against a threshold, to determine which side of the line G an inserted coin lies on. If the coin lies, in FIG. 17, below the line G then it is discriminated as a slug and, in step 306 of FIG. 15, a narrow window $W_2$ is selected for the $M_2$ measurement axis to exclude the regions of overlaps 730.

Naturally, non linear discriminants may be employed (for example, quadratic discriminants as in the first above described embodiments) to restrict acceptance by modifying acceptance boundaries on single measurements, or on linear or non linear combinations of measurements.

Ninth Embodiment

Preferably, in all of the above described embodiments other than the first, second or third, in addition to testing whether a predetermined number of valid coins have arrived after restriction of acceptance has been imposed by any of the above methods, a further test of the length of time which has elapsed is also performed since it is found that criminals attempting to defraud coin operated machines often become discouraged after a period of time. For example, a time out corresponding to ten minutes, or a number of hours may be employed, and the original a priori probability, or the original acceptance window width, may be restored after this period since last receipt of a slug.

Figure 18:
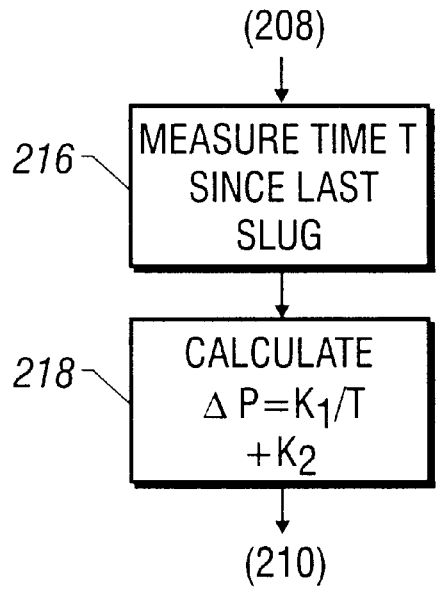
FIG. 18 is a flow diagram illustrating the modification to FIG. 12 in a ninth embodiment.

Referring to FIG. 18, a more sophisticated arrangement according to this embodiment (for use with the embodiment of FIG. 12) performs steps 216 and 218 before performing step 210 in FIG. 12. In step 216, the control circuit 8 measures the time which has elapsed since the last occasion when a slug was recognised in step 206, using the clock 12. In step 218, this time T is used to calculate the amount by which the a priori probability P is increased in step 210. For example, the increase in a priori probability $\Delta P$ may be calculated as $\Delta P = K_1/T + K_2$ ($K_1$ and $K_2$ being constants), so that an increment of $K_2$ (which may be zero) is always added, with an additional increment $K_1/T$ which is large when the time since a slug was last inserted was small.

It is also possible in this embodiment to reduce the a priori probability for a slug after each occasion on which a genuine coin is recognised, the increment by which the a priori probability is reduced being similarly dependent on the time which has elapsed since a slug was last recognised. A default lower limit may be employed in this case.

The time which has elapsed since the last insertion of a coin may be utilised in other manners; for example, the a priori probability for one type of slug corresponding to one denomination of a foreign coin set may be varied after insertion of another member of the same coin set is detected. Rather than simply using the time since the last valid coin or since the last detected slug, the ratios of the time since the last slug to the time since the last coin could be used instead.

Tenth Embodiment

Figure 19:
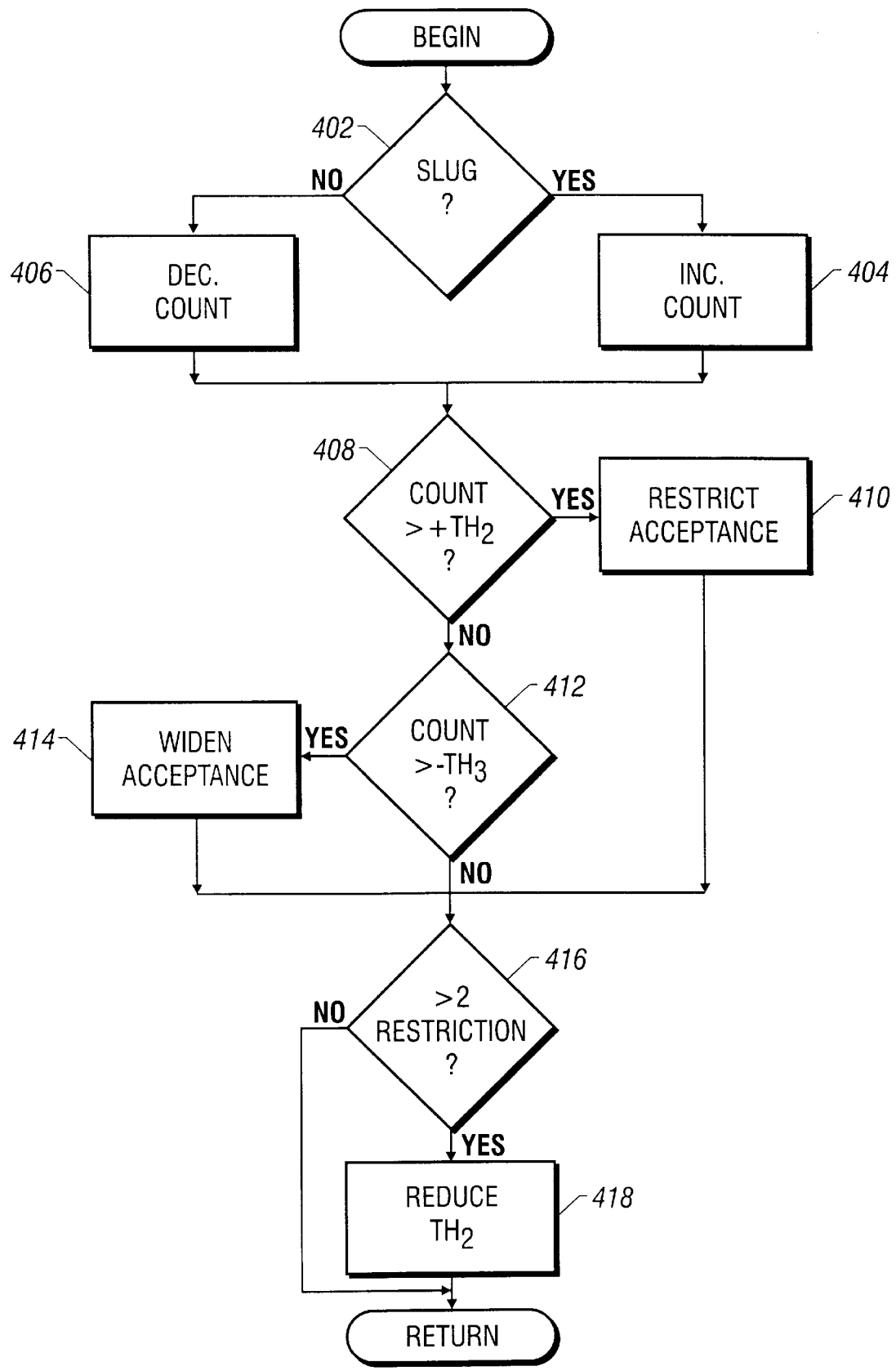
FIG. 19 is a flow diagram showing the operation of the control circuit in a tenth embodiment.

In a further embodiment of the invention, usable with any of the foregoing embodiments other than the first, second or third, the threshold required to invoke the acceptance restriction mode alters over time. Referring to FIG. 19, if a slug is detected by any of the above methods in a step 402, a counter (initiated at zero) is incremented in a step 404; if a slug is not detected in step 402, the counter is decremented in a step 406.

If the count held in the counter exceeds a threshold in step 408, future acceptance of similar slugs is restricted in a step 410 (e.g. by any of the above described methods such as reducing the acceptance window size or increasing the likelihood of future recognition as a slug) in a step 410. If in a step 412 the count is detected to lie below a minimum threshold, indicating a predominant acceptance of valid coins, the acceptance region is broadened once more in a step 414 as described above.

A further count is kept of the number of occasions on which acceptance has been restricted (step 410). If this exceeds a predetermined number (for example 2) in a step 416, the threshold $TH_2$ tested in step 408 is reduced, in a step 418. The threshold $TH_2$ may commence at a value of, for example 2; the negative threshold $TH_3$ may be substantially larger (i.e. it may take a considerable number of valid coins to trigger step 414).

Eleventh Embodiment

In the third embodiment described above, mean values are self adjusted by computing a correction to the means using only accepted coins which lie within a predetermined threshold TH, which is well within the normal acceptance region.

In the present embodiment, rather than using all coin measurements which lie within this region and ignoring other acceptable coins which lie outside it, account is taken of the probability that a given coin is genuine or not.

Generally, in updating means in self adjusting validators, the value of the mean $\overline{M}_k$ for each measurement $\overline{M}_k$ is recalculated as follows:

$$\overline{M}_k = \overline{M}_{k\ old} + Q \cdot \Delta_k$$

where $\overline{M}_{k\ old}$ is the previous stored mean for the measurement $M_k$, Q is a scaling factor (less than 1), and $\Delta_k$ is the difference between the new measurement $M_k$ and the previous mean $\overline{M}_{k\ old}$; i.e.

$$\Delta_k = M_k - \overline{M}_{k\ old}$$

In the present embodiment, instead of using a fixed coefficient Q, a coefficient is employed which tends to a value $Q_0$ (substantially less than 1) when the probability that the inserted coin is valid is at its maximum, and has progressively lower values for progressively lower values of probability that the inserted coin is valid.

Since the adjusted distance AD for a given coin is monotonically related to the probability that an inserted coin corresponds to that coin type, the adjusted distance can be used rather than calculating the actual probability. For example, one simple relationship achieving this effect is:

$$Q = Q_0 \left(1 - \frac{AD_j}{TH_4}\right)$$

where $TH_4$ corresponds to some predetermined acceptance threshold (such as that indicated by the line segment A1 in FIG. 7), for example corresponding to the distance beyond which coins are rejected in the third embodiment described above.

Thus, for coins which are close to the currently stored mean value (and hence for which the adjusted distance $AD_j$ is small) the term Q for a given measurement is close to $Q_0$ (which may be, for example, 1/16). For coins which are progressively further from the existing mean, and are hence progressively less likely to be genuine (assuming relatively slow change in the measurement statistics), the value of the term Q falls away towards zero.

In this embodiment, account may be taken not only of the probability that an inserted coin is genuine, but also of the probability that it is a slug. Thus, for coins close to the discriminant surface between a given type of coin and another type of coin or slug, the probability that the coin is a slug still exists even if it has been accepted. Accordingly, the factor Q may take account also of the distance from the center of a slug population. One relationship achieving this effect is:

$$Q = Q_0 \left(1 - \frac{AD_j}{TH_4}\right) \cdot \left(1 - \frac{AD_j}{AD_{j+1}}\right)$$

where $(AD_j/AD_{j+1})$ is the ratio of the adjusted distances to the center of the coin type j and an overlapping slug class j+1. Since the coin has been accepted, this ratio is always less than unity.

For acceptable coins located distantly from the discriminant surface, this ratio is small and hence its effect on the coefficient Q is small. However, close to the discriminant surface the ratio approaches unity and therefore reduces the value of the coefficient Q and, consequently, the extent to which the mean for the valid coin population is adjusted.

In order to confine the effect to only the area of the discriminant, the ratio of the coin adjusted distance to the slug adjusted distance (and hence the coin probability to the slug probability) may be raised to a higher power in the above relationship.

Thus, in this embodiment, the control circuit 8 is arranged to operate somewhat in the manner disclosed above with reference to FIG. 11 but replacing the step 202 of determining whether the coin measurements lie within an inner acceptance region by a step 203 of calculating the adjustment factor Q using either one of the above relationships.

This embodiment may also be utilised with the embodiment described above with reference to FIGS. 14 and 15, or similar apparatus, by replacing the adjusted distances in the above relationship with the distances along the measurement axis from the coin measurement to the center of the valid coin window and the center of the slug window z. This embodiment may also be utilised separately from all the above described embodiments in conventional coin validation apparatus.

Twelfth Embodiment

Figure 20:
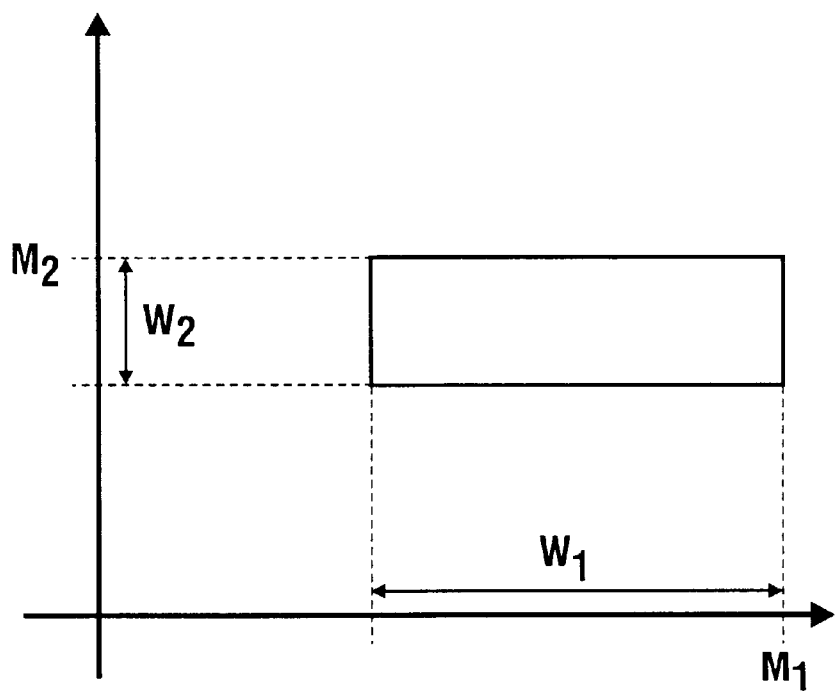
FIG. 20 is a diagram showing a rectangular acceptance region on two measurement axes utilised in a first arrangement according to a twelfth embodiment of the invention.

Referring to FIG. 20, in a coin validator such as that disclosed in GB-A-2093620, the acceptance region is defined by upper and lower thresholds on each measurement axis $M_1$, $M_2$, so as to define a rectangular (or, in general, cuboidal) acceptance region. The width of the acceptance region between the upper and lower thresholds on the measurement axis $M_1$ is denoted $W_1$; that on measurement axis $M_2$ is denoted $W_2$ and so on.

As has been mentioned, in the prior art, the coefficient Q used to self adjust the means $\overline{M}_1$, $\overline{M}_2$ . . . has had a fixed value (for example 1/16), which may vary over time.

In this embodiment, the coefficient Q is different for different measurement axes. The coefficient $Q_k$ for the k'th measurement axis is $Q_k = Q_0/W_k$. Thus, in this embodiment, the control circuit 8 is arranged to update the mean on each measurement axis for each coin type, by an amount which is scaled in accordance with the width of the acceptance window on that measurement axis, so as to depend upon how close the measurement of the inserted coin is to the edge of the coin window.

This can be advantageous in some circumstances, since it enables the means to be adjusted more rapidly on axes where the inserted coin measurements are close to the window edge; under such circumstances, if the coin population is genuinely at the edge of the window, utilising a smaller value of the coefficient Q could result in the coin population of genuine coins moving outside the window before self adjustment had realigned the window.

Figure 21:
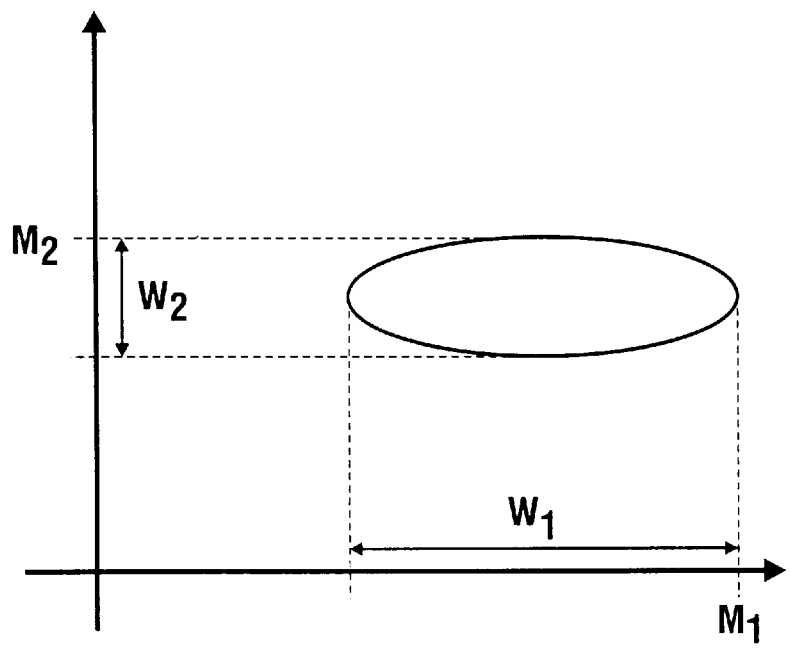
FIG. 21 corresponds to FIG. 20 and illustrates an acceptance region used in a second arrangement according to the twelfth embodiment.

Referring to FIG. 21, this embodiment is also utilisable where the acceptance region is defined by stored data defining an ellipsoid, as disclosed in WO-A-92/18951 for example. In this case, the quantities $W_k$ represent the length of the major axes of the ellipsoid. Although FIG. 21 shows an ellipse aligned with the measurement axes, the invention could in principle be utilised with ellipsoids lying in any orientation relative to the measurement axes, with appropriate modification.

This embodiment of the invention is particularly suitable for use where the edges of the coin acceptance region are distant from known slug populations, but it may equally be used where the coin distribution overlaps with slug distributions, by the use of appropriate anti-cheat criteria as disclosed in the above embodiments or in EP-A-0480736.

Thirteenth Embodiment

Although the above described embodiments relate to a coin validator as shown in FIG. 1, they are also applicable to banknote validation.

Figure 22:
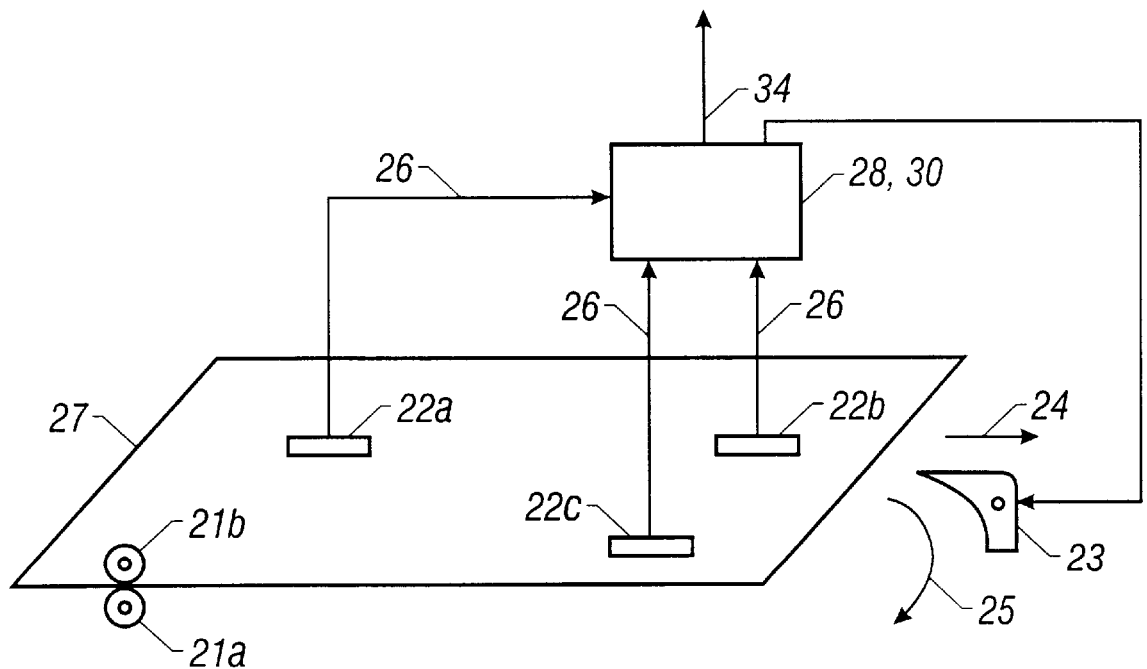
FIG. 22 is an illustrative diagram showing the components of a banknote validator utilised in a thirteenth embodiment of the invention (but known of itself).

FIG. 22 shows schematically a banknote validator for a banknote 27 comprising a transport system shown as 21a, 21b for driving the banknote 27 past a sensing system comprising three sensors 22a, 22b, 22c, (which, in this embodiment, comprise multicolour sensing heads as disclosed for example in GB-A-1470737) the outputs of which are supplied on signal lines 26 to a control unit 28 incorporating a store 30.

The control unit 28 generates output signals on lines 34, one of which controls a diverter 23 between a first position in which a banknote is directed on a path 24 to a valid banknote store and a second position in which a banknote is directed on a path 25 to a reject slot (not shown).

In general terms, each of the sensors 22a–22c is arranged to take a number of readings as the banknote 27 passes the sensor system, so that each sensor scans points along a respective line along the banknote to detect three colours at each point, as disclosed in, for example EP-A-0560023. The readings from the sensors 22a–22c for each point along the note are processed by the control unit 28, 30, for example as disclosed in EP-A-0560023, to derive a smaller number of measurements which are then employed in place of the coin sensor outputs exactly as disclosed in the above embodiments.

Fourteenth Embodiment

In the ninth embodiment described above, acceptance is temporarily restricted and/or restored, in accordance with a time measurement and more specifically a measure of time elapsed since a previous event such as the insertion of a false coin. In this embodiment, the absolute time is employed to control the acceptance rate.

Accordingly, in this embodiment, the control circuit 8 is operable to read the clock 12 and to determine the time of day. Within the store 10, multiple time windows are stored comprising a start time and an end time (or a duration time). When the time indicated by the clock 12 corresponds to a start time, an amount P is added to the Mahalanobis distance to increase the a priori probability, until the end time is reached.

This embodiment is based on the discovery that attempts to "slug" a machine are more commonly observed within recurring time intervals; for example, at certain times of day, or at certain days of the week, or within certain weeks of the year. For example, where slugging attempts are made by school children, the a priori slug probability may be increased (and hence the rate of acceptance of slugs should be decreased) in the morning before school hours; during school lunch breaks; and in the early evening after school hours.

Likewise, in locations where foreign coins are often deposited by tourists, the a priori probability for each given foreign coin type may be increased during the peak tourism seasons (e.g. over the summer months for summer resorts, or over the winter months for winter resorts).

Naturally, rather than either adding no increment to the a priori probability (or, more strictly, to the Mahalanobis distance from the slug type) by default and then adding an increment P during each predetermined time window, it would of course be possible to add an increment by default and add no increment during predetermined, "safe", time periods, or to add first and second increments in first and second different time periods corresponding to "safer" or "less safe" times.

It would also, of course, be possible to employ the present embodiment with fixed rectilinear acceptance windows for each measurement, to switch between broad and narrow acceptance windows for one or more measurements at particular times of day, days of the week or weeks of the year. Accordingly, this embodiment may be combined with any of the foregoing embodiments.

The store 10 may include multiple different sets of restriction data (each set of data comprising one or more recurring restriction period time windows defined by a start and an end time or a time and a duration) and associated restriction data (e.g. defining a broad acceptance region and a narrower acceptance region), corresponding to different geographical locations or zones, and means may be provided for selecting one of the sets in dependence upon the location in which the machine is to be used.

Other Embodiments and Modifications

In the foregoing, the term "coin" is used to refer not only to valid coins but also, where the context requires, to counterfeit coins, and to tokens and the like in the form of coin shaped objects.

Likewise, the term "banknote" refers also to other articles of value such as pre-printed cheques which can be similarly characterised.

Other sensing systems than optical or magnetic sensing systems can be employed for either coins or banknotes; for example acoustic sensing systems as in U.S. Pat. No. 4,463,607 or magnetic banknote sensing systems as in U.S. Pat. No. 4,864,238, U.S. Pat. No. 4,967,156 or U.S. Pat. No. 5,014,006.

For ease of visualisation, the above embodiments are illustrated in relation to two dimensional (e.g. two measurement) systems. However, it should be understood that the invention is primarily intended for use with larger numbers of measurements (for example four or five different measurements).

Although calculation of equations has been described above, it will be apparent that stored look up tables could be provided in (e.g. ROM), storing the results of such equations (and, if desired, the results of the acceptance tests which follow) for a range of input values, and the term "calculate" and similar terms in this document are intended to refer also to look-up processes using such stored tables.

It will be understood that the present invention is not limited to the above described embodiments but extends to all other obvious modifications or equivalent constructions, whether or not within the scope of the enclosed claims, and protection is sought for any and all novel subject matter contained herein and (except where expressly indicated to the contrary) to all combinations thereof.

We claim:

1. A method of testing coins comprising taking at least two measurements of an unknown coin: and accepting said unknown coin as corresponding to a first coin type if the point defined by the measurements lies, in the space defined by the axes of the measurements, on a first side of a discriminant surface at which the Mahalanobis distances to the centers of the distribution of said first coin type and a second coin type are in a predetermined relationship, wherein said relationship corresponds (at least approximately) to equality of the sums of the respective Mahalanobis distances with respective unequal predetermined constants at least one of which is non-zero.

2. A method according to claim 1 in which each said constant is, for each said coin type, the logarithm of the determinant of the covariance matrix of the distribution of the coin type.

3. A method according to claim 1, in which said constant is, for each said coin type, $-P_j$ where $P_j$ is twice the logarithm of the relative prior probability of occurrence of the coin type.

4. A method according to claim 1, in which said constant is, for each coin type, $\ln|\Sigma_j| -P_j$ $\ln|\Sigma_j|$ is the logarithm of the determinant of the covariance matrix of the distribution of the coin type and $P_j$ is the logarithm of the relative prior probability of occurrence of the coin type.

5. A method according to claim 1, comprising deriving said first and second sums and comparing said first and second sums.

6. A method according to claim 5, comprising calculating first and second Mahalanobis distances and adjusting at least one said distance.

7. A method according to claim 1, comprising deriving a non-linear function of said measurements and comparing said function with a threshold corresponding to said discriminant.

8. A method according to claim 1, wherein said second coin type is a counterfeit coin.

9. A method according to claim 1, wherein said second coin type is a foreign coin.

10. A method of testing an article of money comprising taking at least two measurements of an unknown article and accepting the article as corresponding to a first article type if it lies, in the space defined by the measurement axes, on a first side of a discriminant comprising a surface or line which is not parallel to one of the axes, and changing the shape of the discriminant on detection of possibly non-genuine articles.

11. A method according to claim 10, in which the discriminant comprises a surface or line at which two sums, each corresponding to a Mahalanobis distance from a point in said space added to a respective predetermined constant, are equal.

12. A method according to claim 11, comprising varying one or more of the predetermined constants to change the shape of the discriminant.

13. A method according to claim 10, comprising storing data defining first and second alternative discriminants having different shapes, and selecting one of said stored discriminants.

14. A method according to claim 13, in which each of said discriminants comprises at least one straight line or plane, the slopes and positions of the corresponding lines or planes of the first and second discriminants being different.

15. A method of testing an article of money comprising taking at least two measurements of an unknown article and accepting the article as corresponding to a first article type if it lies within an acceptance region in the measurement space defined by axes corresponding to said measurements, the region extending along each said axis, comprising temporarily altering the acceptance region along a first axis in dependence upon whether the unknown article meets a possible counterfeit criterion influenced by the value of a measurement corresponding to a second axis.

16. A method according to claim 15, in which the possible counterfeit criterion is a test of the value of the measurement corresponding to said second axis.

17. A method according to claim 15, in which the possible counterfeit criterion is a test of the value of a function of both the measurements corresponding to said first and second axes.

18. A method according to claim 16 in which the test comprises a comparison with at least one predetermined threshold.

19. A method according to claim 15, in which said acceptance region is bounded, at least in part, by an elliptical line or surface.

20. A method according to claim 27 comprising the step of calculating a Mahalanobis distance function.

21. A method according to claim 15, in which said acceptance region is bounded, at least in part, by a straight line or planar surface.

22. A method according to claim 21, in which the line or surface is parallel to a said axis.

23. A method according to claim 21, in which the line or surface is neither normal nor parallel to at least one of the axes.

24. A method according to claim 19, in which the step of temporarily altering the acceptance region comprises altering the line or surface.

25. A method according to claim 15, in which the step of temporarily altering the acceptance region is taken in dependence upon a relationship between measurements from more than one said unknown article.

26. A method according to claim 25, in which the relationship comprises a count of the difference between the number of coins accepted and the number meeting the possibly counterfeit criterion.

27. A method according to claim 17 in which the test comprises a comparison with at least one predetermined threshold.

28. A method of testing an article of money comprising taking at least two measurements of an unknown article and accepting the article as corresponding to a first article type if it lies within an acceptance region in the measurement space defined by axes corresponding to said measurements, the region extending along each said axis, comprising temporarily altering the acceptance region along a first axis in dependence upon whether the unknown article meets a possible counterfeit criterion, in which the criterion indicates a possibility that the unknown article may correspond to a second article type and is met if the article lies within a second region within the measurement space which encompasses the center of the distribution of said second article type.

29. A method of testing an article of money comprising taking at least two measurements of an unknown article and accepting the article as corresponding to a first article type if it lies within an acceptance region in the measurement space defined by axes corresponding to said measurements, the region extending along each said axis, comprising temporarily altering the acceptance region along a first axis in dependence upon whether the unknown article meets a possible counterfeit criterion, in which the criterion indicates a possibility that the unknown article may correspond to a second article type and is met if the article lies within a second region within the measurement space which is not contiguous with said acceptance region.

30. A method of testing an article of money comprising taking at least two measurements of an unknown article and accepting the article as corresponding to a first article type if it lies within an acceptance region in the measurement space defined by axes corresponding to said measurements, the region extending along each said axis, comprising temporarily altering the acceptance region along a first axis in dependence upon whether the unknown article meets a possible counterfeit criterion, further comprising the step of taking a time measurement and altering said acceptance region in dependence upon the time measurement.

31. A method according to claim 30, comprising restoring an original acceptance region in dependence upon said time measurement.

32. A method according to claim 30, comprising calculating a new acceptance region utilising said time measurement.

33. A method according to claim 30 in which said time measurement is a measure of the time since said possible counterfeit criterion was last met.

34. A method according to claim 30 in which said time measurement is a measure of the time since the last insertion of an unknown article.

35. A method according to claim 30, in which said step of altering said acceptance region is conducted in dependence upon whether said time measurement falls within one or more periodically recurring time windows.

36. A method of operating a money validator operable to validate an article of money by taking at least two measurements of an unknown article and accepting the article as corresponding to a first article type if it lies, in the space defined by the measurement axes, in a first acceptance region, the first acceptance region being adjusted in accordance with measurements of accepted articles processed by a weighting function, in which the weighting function varies in inverse relationship to the likelihood that the unknown article is not of said first article type.

37. A method according to claim 36, comprising the step of deriving a measure of the likelihood that the unknown article is of said first type, and using said measure to adjust said acceptance region.

38. A method according to claim 36, comprising the step of deriving a measure of the likelihood that the unknown article is of a second type, and using said measure to adjust said acceptance region.

39. A method according to claim 37 in which said measure is a distance measure.

40. A method according to claim 38 in which said measure is a distance measure.

41. A method of operating a money validator operable to validate an article of money by taking at least two measurements of an unknown article and accepting the article as corresponding to a first article type if it lies, in the space defined by the measurement axes, in a first acceptance region extending along said axes, the first acceptance region being adjusted in accordance with measurements of accepted articles scaled by respective, unequal, weighting factors.

42. A method according to claim 41, in which the product of the weighting factor for a first said measurement and the width of the region along the first measurement axis is, at least approximately, equal to the corresponding product for a second said measurement.

43. Apparatus for testing coins comprising a sensing system for taking at least two measurements of an unknown coin and means for accepting said unknown coin as corresponding to a first coin type if the point defined by the measurement lies, in the space defined by the axes of the measurements, on the first side of the discriminant surface at which the Mahalanobis distances to the centers of the distribution of said first coin type and the second coin type are in a predetermined relationship, wherein said relationship corresponds (at least approximately) to equality of the sums of the respective Mahalanobis distances with a respective unequal predetermined constant at least one of which is non-zero.

44. Apparatus for testing an article of money comprising a sensing system for taking at least two measurements of an unknown article and means for accepting the article as corresponding to a first article type if it lies, in the space defined by the measurement axes, on the first side of a discriminant comprising a surface or line which is not parallel to one of the axes, and for changing the shape of the discriminant on detection of possibly non-genuine articles.

45. Apparatus for testing an article of money comprising a sensing system for taking at least two measurements of an unknown article and means for accepting the articles corresponding to a first article type if it lies within an acceptance region in the measurement space defined by axes corresponding to said measurements, the region extending along each said axis, comprising means for temporarily altering the acceptance region along a first axis in dependence upon whether the unknown article meets a possible counterfeit criterion, influenced by the value of a measurement corresponding to a second axis.

46. Apparatus for testing an article of money comprising a sensing system for taking at least two measurements of an unknown article and means for accepting the article as corresponding to a first article type if it lies within an acceptance region in the measurement space defined by axes corresponding to said measurements, the region extending along each said axis, comprising means for temporarily altering the acceptance region along a first axis in dependence upon whether the unknown article meets a possible counterfeit criterion, in which the criteria indicates a possibility that the unknown article may correspond to a second article type, and is met if the article lies within a second region within the measurement space which encompasses the center of the distribution of said second article type.

47. Apparatus for testing an article of money comprising a sensing system for taking at least two measurements of an unknown article and means for accepting the article as corresponding to a first article type if it lies within an acceptance region in the measurement space defined by axes corresponding to said measurements, the region extending along each axis, comprising means for temporarily altering the acceptance region along the first axis in dependence upon whether the unknown article meets a possible counterfeit criterion, in which the criterion indicates the possibility that the unknown article may correspond to a second article type, and is met if the article lies within a second region within the measurement space which is not contiguous with said acceptance region.

48. Apparatus for testing an article of money comprising a sensing system for taking at least two measurements of an unknown article and means for accepting the article as corresponding to a first article type if it lies within an acceptance region in the measurement space defined by axes corresponding to said measurements, the region extending along each said axis, comprising means for temporarily altering the acceptance region along a first axis in dependence upon whether the unknown article meets a possible counterfeit criterion, further comprising means for taking a time measurement and altering said acceptance region in dependence upon the time measurement.

49. A money validator operable to validate an article of money comprising a sensing system for taking at least two measurements of an unknown article and means for accepting the article as corresponding to a first article type if it lies, in the space defined by the measurement axes, in a first acceptance region, the first acceptance region being adjusted in accordance with measurements of accepted articles processed by a weighting function, in which the weighting function varies in inverse relationship to the likelihood that the unknown article is not of said first article type.

50. A money validator operable to validate an article of money comprising a sensing system for taking at least two measurements of an unknown article and means for accepting the article as corresponding to a first article type if it lies, in the space defined by the measurement axes, in a first acceptance region extending along said axes, the first acceptance region being adjusted in accordance with measurements of accepted articles scaled by respective, unequal, weighting factors.

* * * * *